(12) United States Patent
Zheng et al.

(10) Patent No.: US 9,158,672 B1
(45) Date of Patent: Oct. 13, 2015

(54) DYNAMIC DETERMINISTIC ADDRESS TRANSLATION FOR SHUFFLED MEMORY SPACES

(71) Applicant: Rambus Inc., Sunnyvale, CA (US)

(72) Inventors: Hongzhong Zheng, Sunnyvale, CA (US); Brent Steven Haukness, Monte Sereno, CA (US)

(73) Assignee: Rambus Inc., Sunnyvale, CA (US)

( * ) Notice: Subject to any disclaimer, the term of this patent is extended or adjusted under 35 U.S.C. 154(b) by 385 days.

(21) Appl. No.: 13/644,550

(22) Filed: Oct. 4, 2012

Related U.S. Application Data

(60) Provisional application No. 61/548,089, filed on Oct. 17, 2011.

(51) Int. Cl.
*G06F 12/00* (2006.01)
*G06F 12/02* (2006.01)

(52) U.S. Cl.
CPC .... *G06F 12/0246* (2013.01); *G06F 2212/2022* (2013.01)

(58) Field of Classification Search
CPC .............. G06F 12/0246; G06F 2212/7211; G06F 2212/1036; G06F 3/0688
See application file for complete search history.

(56) References Cited

U.S. PATENT DOCUMENTS

| | | | | |
|---|---|---|---|---|
| 5,291,582 | A * | 3/1994 | Drako et al. | 710/26 |
| 2005/0055495 | A1 | 3/2005 | Vihmalo et al. | |
| 2009/0259801 | A1 | 10/2009 | Kilzer et al. | |
| 2010/0281202 | A1* | 11/2010 | Abali et al. | 711/103 |

FOREIGN PATENT DOCUMENTS

EP  1804169  4/2007

OTHER PUBLICATIONS

Ferreira et al. "Increasing PCM Main Memory Lifetime," Design, Automation & Test in Europe Conference & Exhibition (Date), 2010, Mar. 8-12, 2010, pp. 914-919. 6 pages.
Ipek et al., "Dynamically Replicated Memory: Building Reliable Systems from Nanoscale Resistive Memories," ASPLOS '10, Mar. 13-17, 2010, Pittsburgh, Pennsylvania, pp. 3-14. 12 pages.
Lee et al., "Phase-Change Technology and the Future of Main Memory," Micro, IEEE, vol. 30, No. 1, pp. 131-141, Jan.-Feb. 2010. 11 pages.

(Continued)

*Primary Examiner* — Reginald Bragdon
*Assistant Examiner* — Thanh D Vo
(74) *Attorney, Agent, or Firm* — Marc P. Schuyler

(57) ABSTRACT

A memory storage scheme specially adapted for wear leveling (or other reorganization of logical memory space). Memory space includes a logical memory space of M addressable blocks of data, stored as rows or pages, and N substitute rows or pages. Data is periodically shuffled by copying data from one of the M addressable blocks to a substitute row, with the donating row then becoming part of substitute memory space, available for ensuing wear leveling operations, using a stride address. The disclosed techniques enable equation-based address translation, obviating need for an address translation table. An embodiment performs address translation entirely in hardware, for example, integrated with a memory device to perform wear leveling or data scrambling, in a manner entirely transparent to a memory controller. In addition, the stride address can represent an offset greater than one (e.g., greater than one row) and can be dynamically varied.

23 Claims, 7 Drawing Sheets

(56) References Cited

OTHER PUBLICATIONS

Qureshi et al., "Enhancing Lifetime and Security of PCM-Based Main Memory with Start-Gap Wear Leveling", Micro '09, Dec. 12-16, 2009, New York, NY, pp. 14-23. 10 pages.

Seong et al, "Security Refresh: Prevent Malicious Wear-out and Increase Durability for Phase-Change Memory with Dynamically Randomized Address Mapping", ISCA '10, Jun. 19-23, 2010, Saint-Malo, France. 12 pages.

* cited by examiner

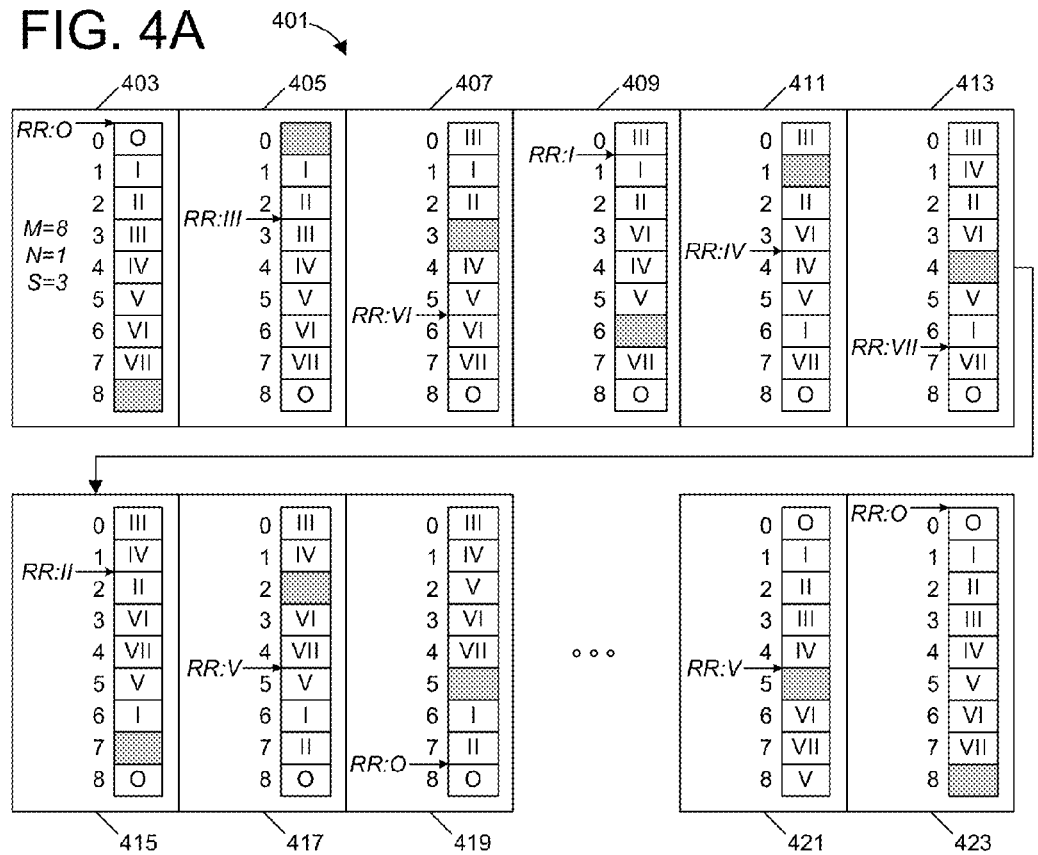
FIG. 4A
FIG. 4B
FIG. 4C
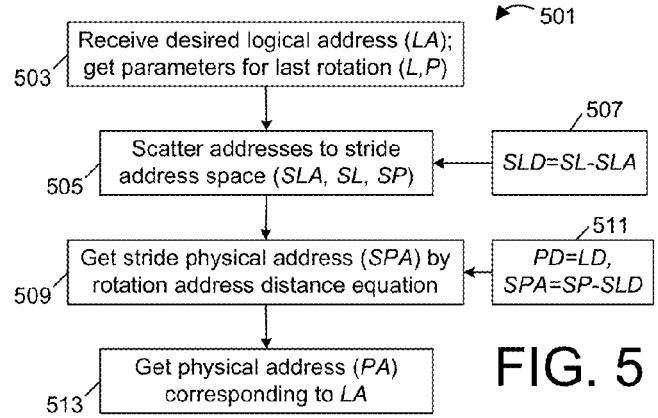
FIG. 5

US 9,158,672 B1

DYNAMIC DETERMINISTIC ADDRESS TRANSLATION FOR SHUFFLED MEMORY SPACES

This application claims the benefit of U.S. Provisional Application No. 61/548,089, filed on Oct. 17, 2011 on behalf of first named inventor Hongzhong Zhen, for "Dynamic Deterministic Address Translation For Shuffled Memory Spaces," which is also hereby incorporated by reference.

BACKGROUND

Reorganizing logical memory space is deliberately performed for a variety of reasons, including security and wear leveling. For example, occasionally changing a physical location where data is stored can make it harder for an attacker to either misappropriate the data or trigger targeted location wear. Wear leveling is used for memory devices with endurance issues to more evenly distribute use-based wear by periodically relocating frequently accessed data to other physical locations within memory; while wear leveling is most commonly associated with flash memory, most memory forms including dynamic random access memory (DRAM) can ultimately suffer use-based wear, and thus can also benefit from wear leveling.

A CPU or other "master" in these circumstances still needs to read, write and otherwise manage the data that has been shuffled or reorganized; an address translation mechanism is used to make that happen. Usually, a look-up table stored in processor cache or local memory is retrieved and used to determine a logical-to-physical mapping corresponding to a desired logical address. For example, in connection with a read or write command, the master (e.g., a memory controller) first retrieves this table and uses it to perform address translation to retrieve a true "physical" address from the look-up table. Once the memory controller has "translated" the logical address to a physical address, it then issues a read, write, refresh or other command to the memory device, corrected to the true memory location.

Unfortunately, as memory becomes increasingly dense, the translation overhead begins to impose too great of a penalty. For example, for an 8 gigabyte flash memory space, an address translation table on the order of 27 megabytes is typically needed and, for a 16 gigabyte flash memory space, a 54 megabyte translation table is typically needed. Not only does the relatively large table size add unacceptable storage overhead, inhibiting local storage of the table, but the large size also requires per-transaction data clock cycle overhead. For example, some designs may require a look-up table that is too large for cache; a memory controller must therefore await return of this data before it can look-up the true address, and only then can the controller issue a corrected memory access command. This latency interferes with the ability to pipeline memory commands and can be unacceptable for many applications.

BRIEF DESCRIPTION OF THE DRAWINGS

FIG. 4A depicts a memory allocation diagram showing how data blocks in logical memory space are scrambled in terms of their relative storage locations as repeated wear leveling/data shuffling iterations are performed.

FIG. 4B provides a table 441 illustrating stride address space; FIG. 4B is used to explain aspects of a detailed wear leveling algorithm. In FIG. 4B, the stride value S is 3.

FIG. 4C provides a table 443, similar to the one seen in FIG. 4B, but which shows stride address (SA) as a function of a provided data block address (A), again for a stride value of 3.

FIG. 5 contains a flow diagram of one embodiment of a method for performing dynamic address translation.

DETAILED DESCRIPTION

I. Introduction

Figure 1:
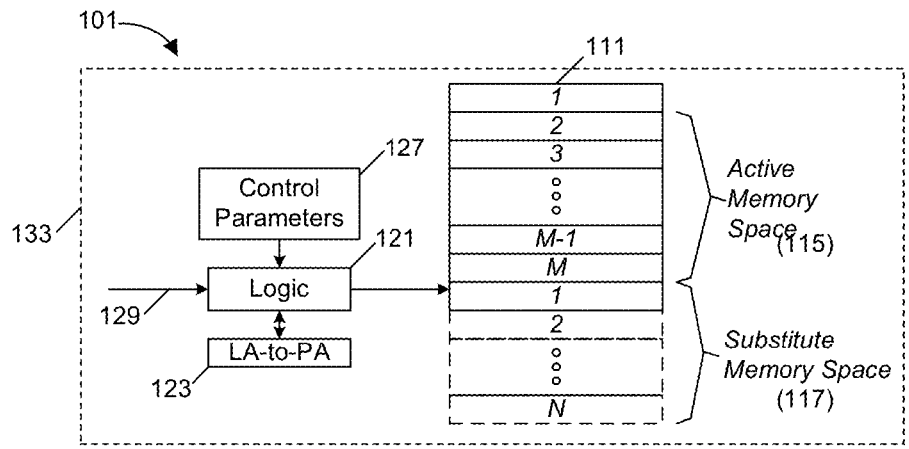
FIG. 1 shows a block diagram illustrating a memory address translation system using one or more "substitute" memory sections and the periodic shuffling of data.

This disclosure provides a memory address translation mechanism and shuffling strategy specially adapted for wear leveling (or other reorganization of logical memory space). This disclosure also provides a memory device, controller or system having a fast address translation mechanism; that is, instead of relying on a lookup table, this fast address translation mechanism enables dynamic address computation based on just a few stored parameters. This strategy and mechanism can be employed in concert with one another, that is, fast address translation can be combined with the mentioned-memory storage shuffling strategy. In one embodiment, this combination permits a memory device, controller or system to perform wear leveling in a manner completely transparent to a memory controller (or operating system). Such a memory technique can be used with large memory spaces without creating unacceptable overhead associated with large address translation tables.

As mentioned, one embodiment provides a wear leveling or data shuffling method. The method defines a first portion of physical memory space as an "active" memory space and a second portion as a "substitute" memory space. The active space is that part of memory used to store host data. The substitute memory space provides one or more stand-in storage locations that will receive data that is to be moved in an upcoming wear leveling or data shuffling operation. With each such operation, a data block in active memory space is chosen based on the logical address of the data block last-moved during a previous wear leveling/data shuffling iteration and based on a stride value. This chosen data block is then copied into a substitute memory section, and the substitute memory section then is used to serve memory commands related to this data (e.g., read commands) as part of the active memory space. The "donor" memory section that was previously used to store this data block then is treated as part of the substitute space (and is later used to receive data copied from somewhere else in a future wear leveling/data shuffling operation). This operation is then iteratively repeated, e.g., based on command, passage of time intervals, usage statistics, or other metrics, with the logical address of the next "donor location" (for data to be moved during the next iteration) being incremented based on the stride value, to progressively rotate selection of the logical data blocks being moved, so as to precess through each data block in the active memory space.

In more detailed versions, the stride value is coprime with the size of the active space in terms of size of the data blocks being moved and the associated "unit" of physical memory (i.e., "section" of physical memory) that will receive data. To provide examples, a "block" of logical data is sized in several embodiments presented below to be equal to a single row of data in a memory device. A block could instead be selected to be integer number of multiple rows, a fractional number of rows, or indeed, any size. As the stride value (in terms of number of blocks) and aggregate number of active sections of memory are coprime, these values have no common divisor other than one. For example, assume that a memory system stores five blocks of data in active memory space (i.e., block-sized sections d0-d4) in five physical sections of memory, p0-p5, and uses one section of physical memory (equal to one block of logical address) as substitute memory space, and that a stride value of 2 is used. The memory space is initially arranged with data blocks d0 to d4, stored respectively in physical sections p0 to p4, and with physical section p5 initially assigned as a substitute block. In a first wear leveling/shuffling iteration, data block d0 is copied from physical data block p0 to reserved physical data block p5, with physical section p0 following the move then regarded as substitute space (e.g., free space—note that it is not necessary to erase or otherwise obfuscate data stored in that section). The data blocks in the active memory space are then ordered as blocks d1, d2, d3, d4, d0 (stored in respective physical sections p1-p5), while physical section p0 is redundant and is generally not used to service commands addressed to logical block d0. That is, if data block d0 represents frequently-used data, memory accesses to data block d0 are directed prior to this iteration to physical section p0 and subsequent to this iteration to physical section p5, thereby distributing wear. Physical section p0 is free for use as a substitute memory section for the next wear leveling iteration (e.g., in schemes that use a single substitute block, physical section p0 will be the destination for the next wear-leveling-based move of data during, while if multiple sections are used, physical section p0 can await its turn in a rotation of multiple substitute memory sections. Note that from a security standpoint, an attacker seeking failure of data block d0 via use-based attack will now encounter address translation that causes these attacks to be redirected to physical section p5, weakening those attacks. Notably, physical sections p1-p4 still store their original blocks of data d1-d4; however, selecting the stride value S to be coprime with the size M of active memory space ensures precession through all logical memory space as additional wear leveling or data shuffling operations are performed, such that wear leveling/shuffling is necessarily distributed. For example, after the above-described operation is completed, the logical address for the data block that will be copied in the next iteration is calculated by taking the logical address of the data block that was previously moved and adding the stride value (i.e., 0+2); the next wear leveling operating is thus directed to logical address d2, followed by d4, followed by d1, followed by d3, and again returning to logical block d0. The result is that each block of data is subjected to wear leveling as part of a circular rotation through logical memory space. Naturally, applied to a real world device (e.g., a flash memory or DRAM integrated circuit, or a memory module) these numbers would be much larger. For example, in one embodiment, each block or a "section" of memory can be a page of memory (e.g., a row of memory serviced by a single wordline); M sections of active memory can number in the thousands (e.g., thousands of rows), and N reserved memory sections can number one or more. Note that S is typically greater than 1.

One advantage obtained by at least some wear leveling or data shuffling embodiments presented by this disclosure is that if parameters are correctly chosen (e.g., stride value, number of active and substitute memory sections, and so forth), an address translation table can be optionally dispensed with, and fast address translation can be used for dynamic, real-time address translation, based on just a few tracked parameters. To provide an example, in one embodiment discussed in detail below, automatic address translation is performed using a desired logical address provided as an input and only five parameters (L, P, S, M and M+N); here, L is the logical address of the data block moved during the last wear leveling or data shuffling operation, S is the stride value and P is the physical address of the section of memory that received the last-moved data block. Address translation thus does not require a massive translation table, but rather, depending on embodiment, can be dynamically performed by a memory controller, a memory device, software, or by a dedicated circuit, such as a buffer circuit located between a memory controller and a controlled memory device. As should be apparent, fast address translation can be equation-based. A still more detailed embodiment will be provided below that performs this translation using only simple shift and add operations, i.e., with an efficient hardware design. This hardware design can be made effective to perform address translation with reduced latency.

It should be apparent that the specific wear leveling/data shuffling method presented above and the use of hardware address translation are optional relative to each other. This is to say, the wear leveling/data shuffling methods introduced above can be used alone (e.g., with conventional table-based address translation techniques) to wear leveling or data location scrambling. Similarly, a device employing fast address translation to dynamically compute a physical address can be used without the specific data shuffling or wear leveling methods provided by this disclosure.

With the principle parts of two basic embodiments introduced, this disclosure will now discuss how wear leveling and address translation are related in some embodiments.

FIG. 1 shows a system 101 that uses both the memory storage method introduced above and a fast address translation mechanism, implemented using either hardware or instructional logic. A physical memory space 111 embodied as one or more memory devices includes M active memory sections 115 to service logical memory space and N substitute memory sections 117. As depicted in FIG. 1, N is at least one, such that the system 101 includes at least one section of substitute memory space, with additional sections in this space being indicated in dashed lines to indicate their optional nature. For the initial embodiments discussed below, it should be assumed that N is 1, but embodiments will later be discussed where N is greater than one and where N is periodically changed, e.g., on a random or other basis.

The system of FIG. 1 performs two basic operations, periodic wear leveling and run-time data operations. These two operations do not necessarily have to be mutually exclusive, i.e., in one implementation, wear leveling can be performed based on data access, and in a second implementation, wear leveling can be performed as part of a periodic refresh operation (see, e.g., FIG. 13). These latter implementations can be especially advantageous for newer memory forms such as resistive random access memory (RRAM) and magnetic random access memory (MRAM).

To implement wear leveling, logic 121 periodically moves or copies a block of data from a "donor" memory section in active memory space 115 to a recipient section in substitute memory space 117, with the donor and recipient sections then effectively trading roles; that is, the donor section is rotated to the substitute memory space, and the recipient section receiving data is placed in active service as part of the active memory space. This movement is described as a single wear leveling iteration or operation. Again, it should be understood that the application of these techniques is not limited to wear leveling. The effects of these actions are exemplified as follows. First, assume that there are eight total logical data blocks and nine correspondingly-sized sections of physical memory, with M being 8 and N being 1, and that logical data blocks d0-d7 are stored in sequential order in M physical memory sections p0-p7, with physical memory section p8 being held for use as a substitute section. Assume further that logical block d3 is now to be moved to the substitute section in connection with wear leveling. Following such a move, the physical memory space would then contain in the following data block sequence d0, d1, d2, X, d4, d5, d6, d7, d3, where space "X" could, immediately following the move, still contain an exact copy of d3 if not erased as part of the operation. If the system, subsequent to the move, is to direct a memory access command to logical block d3, the system requires a new address translation to determine where this logical block now can be found. This understanding is provided in the system of FIG. 1 by functional blocks 121, 123, 125 and 127, seen at the left hand side of FIG. 1; note that these functional blocks are also responsible for managing the performance of wear leveling and tracking resultant changes in memory organization.

As mentioned, a logical "block" of data can be any convenient size and will often be selected based on practical considerations based on a given architecture; in discussion below, it will be assumed to correspond to a single row (or equivalently, a "page" of data). It should be assumed for many embodiments below that the logical block size corresponds to a page of memory (e.g., one row of a flash memory integrated circuit); contemplated, alternate implementations use different sizes, e.g., a programmable or erasable block in some memory architectures, a non-integer number of rows, or less than one row, e.g., a column of data. A stride value "S" is also expressed in these same units, e.g., logical blocks. Although an operation that places the valid copy of a logical block at a new physical section location is referred to below as a data "movement," it is understood that most systems will simply replicate data at the new location, and not disturb the copy at the old location until time to overwrite the old location with a new logical block. In memory types that require erasure prior to data write, an appropriate time to erase the old block may be selected immediately after the copy is verified, just prior to when new data is to be written to the old block, or at any convenient intermediate time.

The logic 121 can be rooted either primarily in software, firmware or hardware, depending on desired implementation. In the context of FIG. 1, this logic relies upon control parameters 127 to move data blocks, such that data is incrementally rotated in a manner that equalizes overall wear to the memory device (in embodiments where wear leveling is a goal). As mentioned above, even wear will result using this memory storage scheme if the stride value S and the size of the active memory space M are chosen to be coprime. Note that the effect of having S>1 will be to scramble memory space.

As mentioned, irrespective of wear leveling, the system also needs to service memory access commands. The structure seen in FIG. 1 is also used for this purpose during normal, "run-time" operations. A memory access command arriving on a signal path 129 may seek data at a logical address that is no longer at the same physical memory address as the last time that data was accessed, due to periodic wear leveling/data shuffling. For a simple case where S=1, logical address space remains contiguous, albeit at a start address that circularly precesses through physical memory space. In this case, logical-to-physical address conversion is relatively straightforward. For a more complex case, however, where S>1, and where S and M are coprime, logical memory space becomes increasingly scrambled with each wear leveling/data shuffling operation, and logical-to-physical address conversion becomes quite complicated. Logic 121 invokes a logical-to-physical address translation function 123 to convert the "logical" address provided by the memory access command to a "physical" section address to obtain the correct data. This is to say, the system 101 tracks the movement of data and uses stored parameters to quickly locate the correct physical section that currently stores the desired data. Conventional address translation techniques can also be used for this translation function (e.g., using an on or off-circuit, updated for each data movement operation, address translation table stored in cache or other memory). Optionally, a fast address translation technique dynamically performs logical-to-physical address translation, that is, in real time, using parameters 127. In one embodiment, equation-based address translation using these stored parameters is performed by instructional logic (see, e.g., FIG. 9B), and in another embodiment, the translation is performed solely by hardware (see, e.g., FIGS. 9C-E). As noted in FIG. 1 by dashed line 133, all of these functions are optionally co-resident on a single device, such as a single memory integrated circuit. This is to say, one device provided by this disclosure is a memory integrated circuit device with on-board address translation logic; this device receives a logical address (from the device's perspective) and without supervision provides the requested data from the correct physical address, notwithstanding the use of dynamic wear leveling/data shuffling. Such an integrated circuit can be in the form of a DRAM, flash, RRAM, or other type of integrated circuit memory device.

Figure 2A:
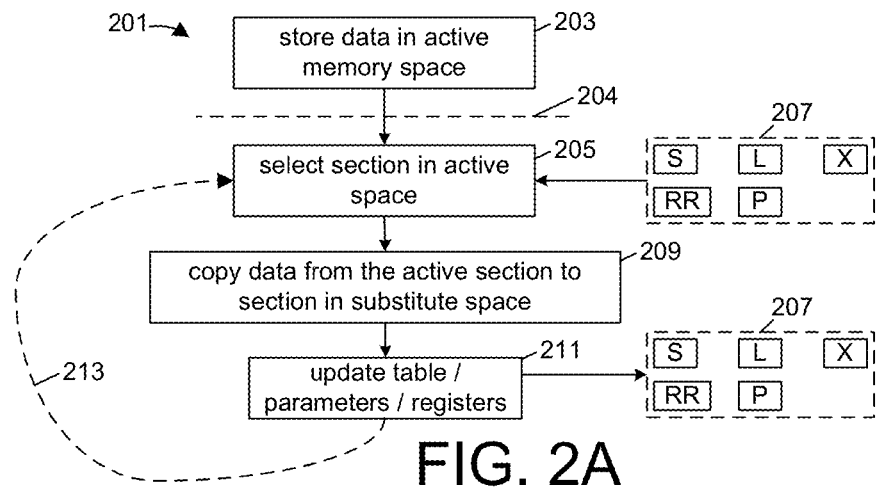
FIG. 2A illustrates a method for managing memory in a manner that facilitates fast address translation. The method of FIG. 2A is optionally used with the address translation system of FIG. 1.

FIG. 2A provides a functional flow diagram 201 that shows how wear leveling can be performed according to the basic methods introduced above. Dashed line boxes 207 denote the optional presence of registers to track wear leveling parameters, for example, so that fast address translation can be employed. As indicated by a first functional block 203, data is periodically stored and updated in an active memory space, for example, during run-time system operation. This active memory space stores the logical space of multiple data blocks introduced earlier, e.g., M logical pages of data in M physical memory sections. At some point, for example when a threshold number of data operations have been performed subsequent to a previous wear leveling/data shuffling iteration, it is determined that wear leveling/data shuffling again needs to be performed. This determination is represented by a dashed line 204, denoting that the system is to now again commence such an operation. A data block and its corresponding "active" physical memory section are selected as a donor location to undergo wear leveling. A target location, i.e., a section to be used as a substitute for the donor section, generally of equivalent size, is then selected, per reference numeral 205. Data is then copied between these physical sections of memory (step 209). This may be optionally done as part of a row copy feature in the memory device, where data is read from one row of data to a page of sense amplifiers, then written back to another row accessible by the same sense amplifiers. This puts constraints on the location of the extra N substitute sections, as these sections would have to be, practically-speaking, in a common bank (e.g., a single memory core serviced by a single set of sense amplifiers) in order to obtain maximum advantage from this type of architecture; however, such an architecture permits use of independent wear leveling/data shuffling algorithms and timing for each such bank.

With the move of data having been accomplished, an address translation table, optional registers (207), or another mechanism used to track wear leveling data is then updated. This update permits data indexed by logical address to be found after the move. The process then awaits a new wear leveling iteration, as indicated by a return loop 213.

As noted, optional registers 207 can be used to store parameters for fast address translation instead of a conventional table lookup. Several of the depicted registers are seen to be labeled "S," "L," "X," "RR" and "P;" these labels refer to one specific embodiment where specific parameters are tracked and updated to facilitate equation-based, dynamic, physical address computation. The use of other parameters and registers and the use of alternate algorithms/equations are also possible. In the context of FIG. 2A, these specific parameters are stride value (S, in units of blocks), last-moved data block logical address (L), the next available substitute section physical location (X), rotation register (RR, i.e., the data block/logical address of the next wear leveling/data shuffling target), and the last recipient section physical address (P, i.e., the previous substitute section). As will be shown below, employed in conjunction with memory storage methods provided herein, these parameters enable near-instantaneous determination of any physical address storing a block of data when a logical address for that block of data is provided. A suitable equation to perform this translation will be introduced further below, in connection with the discussion of FIGS. 4A-C and 5. As mentioned earlier, an optional hardware implementation permits the address translation function to be directly combined with memory; this permits wear leveling in complete transparency to a memory controller.

Figure 2B:
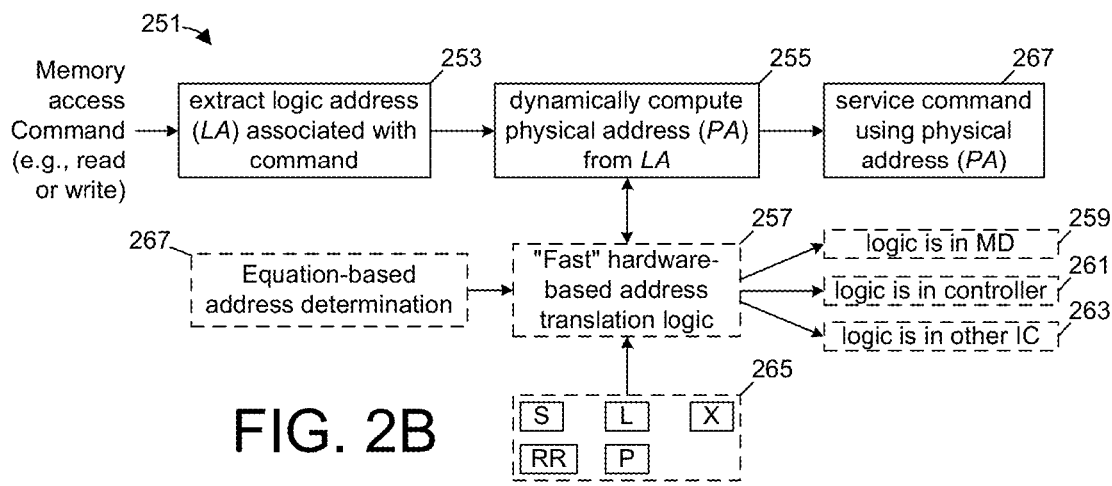
FIG. 2B contains a flow diagram for fast address translation. Generally speaking, dashed-line boxes illustrate optional features. As noted by a specific box 257, the presented teachings permit address translation to be optionally implemented entirely in hardware.

FIG. 2B shows a block diagram 251 illustrating how address translation occurs in such a system. As indicated to the left of FIG. 2B, a memory access command (e.g., read, write, refresh, etc.) provides the system with a logical address for associated data. That is, the command identifies a specific row of data in logical address space that is to be sensed, written to, refreshed, and so forth. Because the data in question may no longer be at the physical address originally associated with this provided logical address, the provided logical address is transformed or translated to the correct address in physical memory space at which the data can presently be found. The physical address space can reside within a single memory device or multiple memory devices. As indicated by function block 253, hardware or instructional logic extracts the logical address (LA) associated with the command, for example, a row number and column number. Note once again that the address can specify a row, that each block of data can consist of a page, and that each memory section holding this quantum of data can be a row; other sizing schemes also exist. Per block 255, the logic then dynamically computes the associated physical address (PA), e.g., row address, where the desired data is presently stored; computation is optionally performed in a memory controller, memory module, or on a DRAM, flash, RRAM or other integrated circuit memory device. In the depicted embodiment, the computation is optionally performed directly by hardware (optional block 257). This hardware can be located in a memory device, memory controller, or in some other IC (as denoted by numerals 259, 261 and 263). The hardware uses registers to store S, L, X, RR, P and/or other parameters as appropriate, as denoted by dashed line box 265. These parameters are then used in an equation-based address calculation, per optional function block 267. Finally, when the address translation is complete, the command is serviced by the memory device using the returned physical address (PA), wherein resides the desired data.

This disclosure will now provide a more thorough understanding of wear leveling according to the principles introduced above, and how this wear leveling progressively changes or scrambles the organization of memory space.

II. Wear Leveling in Greater Detail

Figure 3:
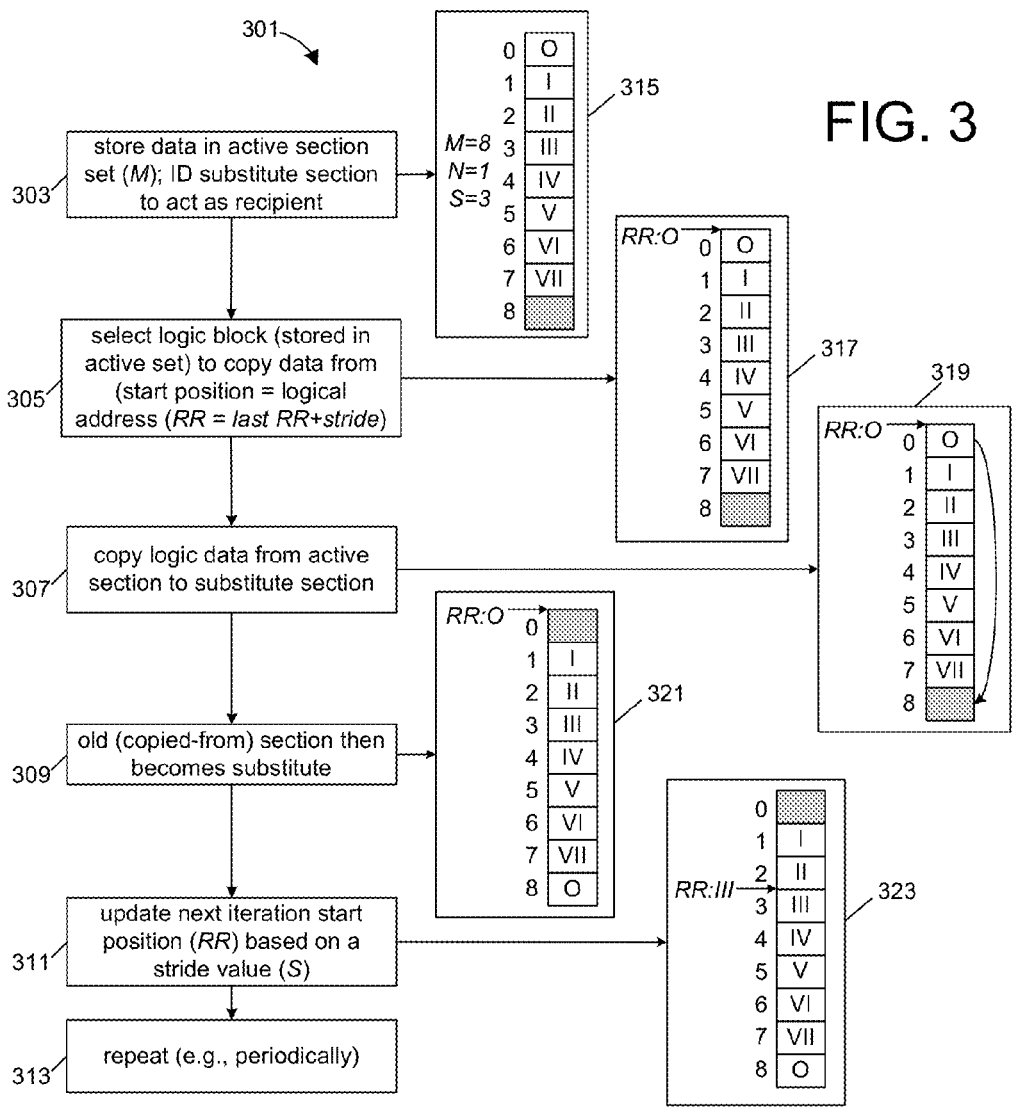
FIG. 3 presents a hybrid flow chart and memory allocation diagram illustrating steps of a single wear leveling iteration. At its right side, the figure provides an example showing how the mapping of logical memory space to sections of physical memory changes with each step.

FIG. 3 is a block diagram 301 showing, at the left, steps for performing a single iteration of wear leveling and, at the right, a set of illustrative blocks showing how logical and physical memory space is affected (e.g., scrambled) by wear leveling.

First, as indicated by element 303, data is read from and written to memory sections associated with an active memory space as part of run-time operations of a memory system. As these operations are on-going, not all memory is actively used to store data, i.e., N sections of memory to be used as substitute memory space are not recognized as part of the active space. An exemplary configuration is seen in illustrative block 315 at the right side of the figure. There are M sections of active memory, where M can be any number; in this example, M is seen to represent an arbitrarily design choice of 8. Illustrative block 315 shows 9 total sections of memory, with one of the nine sections (represented by shading) representing the N sections of memory of substitute memory, i.e., N is 1 in this example. The total number of memory sections M+N is illustrated using ordinary numbers 0-8, whereas the logical address space, is designated using the letter "O" for zero and roman numerals (I-VII). Illustrative block 315 also depicts selection of 3 as the stride value S. For reasons mentioned earlier, M and S have been selected to be coprime, meaning that there is no integer common denominator other than 1. That is, this objective is satisfied in this example, because the only integer that divides into both 8 and 3 is indeed 1. In addition, to simplify mathematical calculations for stride, S can advantageously be made to be less than M, i.e., S<M.

Assume that regular memory operations are performed until it is determined that wear leveling is necessary for the first time. Until this point in time, the logical address for data will correspond to the physical addresses, that is, it represents a "natural mapping" of logical to physical memory space. For example, if a memory command sought data at logical address II, that data would have been found at physical storage section 2. At this point in time, however, it is determined that the system is to iteratively perform wear leveling or scrambling of data.

Note that this determination (i.e., the invocation of wear leveling or scrambling) can occur in a variety of ways, based on one or more triggers. For example, wear leveling can be triggered in connection with "run-time" memory commands, e.g., any time a write, read or other command is directed to the storage section identified by the start position. Wear leveling can also be triggered by a write data count reaching or exceeding a threshold (e.g., y write operations have been received by memory or a specific segment of memory since the last wear leveling operation). Another possible trigger for wear leveling is satisfaction of a timing constraint, for example, any time a timer reaches a certain count since previous wear leveling or in response to a calendared time (e.g., "January 1"). Many other triggers can be used, including any trigger used for conventional wear leveling processes, including ad hoc initiation by a user or an operating system.

The system first selects a "start position" or target data block for wear leveling/data shuffling in the active memory space, per method step 305. In this particular case, since it is the first iteration, the start position is selected based on logical address zero ("O"). The start position identifies a logical data block for the next ensuing wear leveling iteration and its associated physical location. Notably, "RR" is used in the figure as an acronym for the term "rotation register," indicating that a hardware register is optionally used to store a logical or corresponding physical address of the donor section for the next ensuing wear leveling iteration. Once again, a corresponding illustrative block 317 shows the selection of this "start position" (RR=O). The system also determines the corresponding physical address location (i.e., location 0) where the identified logical data block may be found.

The system then proceeds to select a substitute section of memory that will receive the selected data, per numeral 307. In this example, since N is 1, there is only one possible choice; in embodiments where N is greater than 1, a round robin scheme can optionally be used to select the "oldest" substitute section (that is, the section that has been used to service active memory space operations least recently). Accordingly, the data found at physical section 0 (logical address "O") is moved to the substitute section identified by physical address "8," as depicted by illustrative block 319. At this point, the donor section 0 is reassigned to substitute memory space, such that it is now depicted using shading in illustrative block 321. Note that logical memory addresses no longer necessarily correspond to physical address space; that is, if it is desired to access data at logical memory address O, that data is no longer found at physical memory section 0. To complete wear leveling, the start position (e.g., in a rotation register) is updated for use in a subsequent wear leveling iteration, by adding the stride value S to the previous logical address start position; in this case, with RR=O and S=3, the next start position will be RR=III (i.e., 0+3). This step is referenced by numeral 311 and is depicted by illustrative block 323. Note also that if registers are used to track other parameters for equation-based address translation, other such parameters are advantageously updated at this point in time. For example, in one embodiment presented below, parameters L and P are updated to indicate the "last" logical block that was rotated and the physical address of its corresponding substitute section in memory respectively; in updating such parameters using the examples just given, the values 0 (representing O) and 8 would be stored. The physical address of the next logical block for the next wear leveling iteration, parameter X, is then updated (e.g., using the new substitute section or another section of substitute memory space if N>1).

With all of the basic wear leveling steps completed, the method temporarily terminates. Illustrative block 323 depicts both logical and physical memory space in a state that will persist until the performance of the next wear leveling iteration (313). During this time, memory accesses such as write, read, refresh and other memory operations as appropriate will being performed as part of run-time system operation. Note that, during this time, physical section 0 represents the substitute memory space, meaning that generally, no write or read command will be directed to this section until placed back in active use. This section will form the target location where data from the start position (III) will be moved in the next wear leveling iteration, and its physical address is stored as parameter X.

Reflecting upon this data movement strategy, it should be appreciated that with each wear leveling iteration, because S>1, logical memory space will become progressively scrambled relative to physical memory space, until the completion of C wear leveling iterations; again, C is the smallest common integer multiple of both M and M+N. That is to say, in this embodiment, after every 72 repetitions of the method just presented (M=8, M+N=9), the logical and physical memory space and starting position will return to the exact initial organization, to the same initial state depicted within illustrative blocks 315 or 317.

This result is further explained with reference to FIG. 4A, which shows a sequence 401 of illustrative blocks representing a complete cycle of C (e.g., 72) wear leveling iterations. A first illustrative block 403 representing memory organization is identical to illustrative block 317; each block following illustrative block 403 represents a progression of a single iteration of wear leveling. For example, illustrative block 405 is identical to illustrative block 323, representing the fact that one data block has been moved using the process described above, with the start position updated per step 311 (RR=III). A third illustrative block 407 in FIG. 4A represents the fact that data from logical space (RR=III) has now been rotated to the substitute space (physical location 0), and the start position has again been increased by the stride value (RR++=RR+S=VI). The substitute memory space is seen to consist of physical memory section 3, which has just had its contents copied to the previous substitute section. Subsequent to another wear leveling iteration, RR will be equal to I (logical address VI plus the stride value 3, modulo M), as indicated by illustrative block 409. A modulo of M is used because (1) it is not necessary to perform wear leveling for unused, substitute space, (2) memory space is treated in these embodiments as circular, and (3) it is desired, in view of the stride value S, to have the system step through each data block in some progression until all blocks have been processed.

Note that as shown by illustrative block 409, logical space following the fourth wear leveling iteration is fairly scrambled, bearing seemingly indiscernible relationship to the natural mapping of logical-to-physical memory space seen in illustrative block 403. That is, the stored sequence of data blocks is seen to be III, I, II, VI, V, VII and O (3, 1, 2, 6, 4, 5, 7, 0). Please also note that the progression in starting position following each wear leveling iteration can involve a different distance in physical space—in illustrative block 409 for example, the starting position (e.g., physical address "1," stored as parameter "X") has advanced four sections (or rows) in physical memory distance, relative to the physical location of the donor section physical address from the previous wear leveling iteration. The progression in logical memory space is constant and equal to the stride value. The progression in physical memory space in terms of distance between donor sections in successive wear leveling iterations is not necessarily constant.

As indicated by illustrative blocks 411, 413, 415, 417, 419, 421 and 423, the performance of wear leveling in this embodiment continues until the relationship between logical and physical memory space is once again restored to its original value, represented by illustrative block 423, and its equivalence to illustrative block 403. Again, this will occur (using the particular scheme presented here) at a number of wear leveling iterations equal to the lowest common multiple "C" of M and (M+N).

FIGS. 4B and 4C present respective tables 441 and 443 associated with stride address space; these tables are used by an equation-based address translation mechanism to dynamically compute a physical address. In this regard, it was earlier mentioned that at the completion of C repetitions or iterations of wear leveling, the stride value S can optionally be changed. In fact, the stride value S in some embodiments is changeable at any time if an address translation table is used to help map logical memory to physical memory. However, for embodiments that employ fast address translation, enforcing consistency in stride value during kC=kM*M+N rotation cycles (or "k" times a lowest common multiple of M and M+N), where k is an integer, is generally believed to be necessary to dynamically map logical address mapping without using a lookup table. This is to say, if S (and SA) are only changed after C wear level iterations, the tables depicted in FIGS. 4B and 4C remain are valid for a given S.

Figures 6A, 6B, 6C:
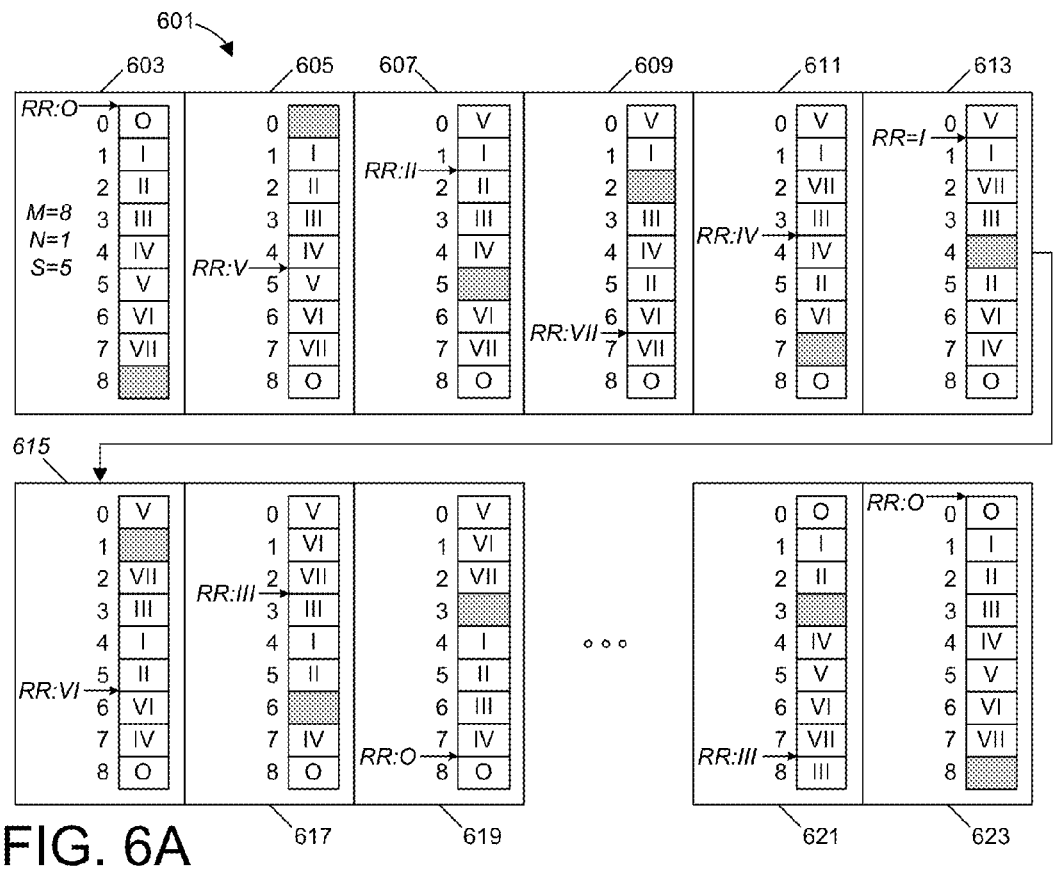
FIG. 6A contains a memory allocation diagram similar to FIG. 4A, but where the stride value S has been increased to 5.
FIG. 6B provides a table 641, similar to the one seen in FIG. 4B, but based on a stride value of 5.
FIG. 6C provides a table 643, similar to the one seen in FIG. 4C, but where the stride value is 2.

A desired physical address PA is given by the equation $$PA = \text{Mod}_{(M+N)}(P - \|L - LA\|),$$

where PA is the desired physical address, LA is the desired logical address, L and P are the logical address of the last-previously-moved data block and corresponding substitute section physical address, respectively, and ||L-LA|| is a distance in stride address space. Stride address space is a virtual space where addresses are mapped by iterations of wear leveling, as seen in FIG. 4C (for stride value of 3). The equation presented above is premised on the concept that in stride address space, distance between two logical addresses is exactly equal to distance between two associated physical addresses, LD=PD. This concept is explained in the accompanying appendix, found at the end of this disclosure. For purposes of the above referenced equation, however, what it means is that physical address can be computed at any time according to the equivalent equations $$PA = \begin{cases} \text{Mod}(SPA, M) & \text{for } (SPA < MxS) \\ SPA/S & \text{for } (SPA \geq MxS) \end{cases};$$

$$SPA = \text{Mod}_{(SxM+SxN)}(SP - \text{Mod}_{SxM}(SL - SLA)),$$

where the relationship between P and L for a particular stride value is exemplified by FIG. 4B, and where stride address is determined according to a table similar to that presented in FIG. 4C. Note that for different values of M and S, the values in these tables change; for example, FIGS. 6A and 6B show similar values, but where M is 8 and S is 5. Once again, these values are illustrative only, i.e., a typical value of M would be in the thousands. Note also that in the case where the stride value is selected to be 1, these tables are unnecessary, i.e., stride address SA is equal to ordinary address. This address translation equation in this case reduces to $$PA = \text{Mod}_{(M+N)}(P - \text{Mod}_M(L - LA)).$$

The case where S=1 presents fairly simple mathematical calculations relative to the cases illustrated in FIGS. 4A-C and 6A-C. That is, all logical addresses remain in logical sequence, but their relative storage locations precess through physical memory until C wear leveling iterations have been performed. For example, with M=8, N=1, and S=1, the logical-to-physical mapping will necessarily at some point in time appear as seen in table 1, below.

TABLE 1

| III | IV | V | VI | VII | O | I | II |
|---|---|---|---|---|---|---|---|
| 0 | 1 | 2 | 3 | 4 | 5 | 6 | 7 | 8 |

For example, in this case, were L and P respectively II and 7, and a logical address of III were sought, the mapping equation would reduce to:

$$PA = \text{Mod}_{(M+N)}(P - \text{Mod}_M(L - LA)) = \text{Mod}_9(7 - \text{Mod}_8(2 - 3)) = \text{Mod}_{(9)}(7 - 7) = 0.$$

The algorithm is somewhat more complex for the example provided by FIGS. 4A-C. Assume that it is desired at a point in time between the wear leveling iterations represented by blocks 417 and 419 to read data from logical address IV. In this example, data at logical address II was moved in the immediately previous wear leveling iteration from physical memory section 2 to physical memory section 7 (compare blocks 415 and 417). Since logical address IV is now sought by a memory command, application of the second formula above would indicate that data for logical address IV in fact resides at physical memory section 1. That is, the value SL-SLA is calculated by mapping L and LA respectively to 18 and 12 (see FIG. 4C), yielding a difference of 6. Since in stride address space physical distance is equal to logical distance, and since P is mapped to 15 using data from FIG. 4C, SPA=SP-SLD=SP-SPD=15-6=9. This value (9), is then reverse mapped using the data from FIG. 4C to obtain physical address 1. The need for a voluminous address translation table is thus obviated since the correct address can be dynamically computed using an equation or equivalent logic. To use a different example, if the sought-after logical address was instead II, then with L=2, LA=2 and P=7, the returned physical address would be 7. As noted above, the above referenced algorithm works so long as stride value S kept constant and is changed only at intervals corresponding to the original, natural mapping state. Perhaps otherwise stated, if both stride value S and the number M of sections of active and N substitute memory sections are kept constant for C repetitions of wear leveling, where C is the smallest integer common multiple of M and M+N, S and N can then be changed at each multiple of C. Note that changing N will also change the future value of C.

Note further that equational logic can be implemented in a number of ways, for example, in software or firmware, via a circuit equivalent, or a combination of these things. If implemented in software, some or all of the functions can be embodied as machine-readable-media that stores instructions that, when executed by a machine such as a computer, cause that machine to mathematically transform a provided address in accordance with the functions described above.

FIG. 5 provides a block diagram 501 showing a method of address translation based on these principles. As indicated by block 503, when a memory command is presented, the method extracts the accompanying logical address LA, and it retrieves stored parameters L and P, representing the last wear leveling iteration. Per block 505, it then scatters these values to stride address space by looking up the stride address value SA for each of L and P (i.e., from table similar to those of FIG. 4C (M=8, S=3) or FIG. 6C (M=8, S=5), but with data defined by the then-in-use choice of M and S). These values are then used to compute a stride logical distance, as indicated by block 507. As indicated by step 509, the system then computes the stride physical address (SPA) corresponding to the desired logical address LA; once again, this is based on the principle in this embodiment that distance between any two logical addresses in stride address space at any time is equal to distance between two corresponding sections (stride physical addresses) associated with that data, provided S and N have not changed relative to the initial, natural mapping. This computation is indicated by function block 511. Finally, with the stride physical address SPA computed, the system performs a reverse lookup function as indicated by numeral 513.

III. Variation in S and N and System Configuration

FIG. 6A is a memory allocation diagram similar to FIG. 4A. However, in the example provided by FIG. 6A, the stride value S has been changed to 5. This stride value and associated partitioning of memory into 9 physical sections are once again arbitrary and are used to simplify discussion.

FIG. 6A presents a sequence 601 of illustrative blocks 603-623. Note that with a different stride value S, the effects of scrambling the memory space are different from the values depicted in FIG. 4A. For example, ignoring the presence of substitute memory space, the mapping of logical memory space to physical memory space depicted in illustrative block 417 (i.e., after 7 iterations of data shuffling) is III, IV, VI, VII, V, I, II and O (3, 4, 6, 7, 5, 1, 2, 0); however, a corresponding block 617 in FIG. 6A (i.e., also representing 7 data shuffling iterations from the same starting configuration) is V, VI, VII, III, I, II, IV and O (5, 6, 7, 3, 1, 2, 4, 0). As should be evident, simply changing the stride value S can significantly change data shuffling patterns. In one embodiment, therefore, registers (such as optional register 125 from FIG. 1) store several alternative, predetermined stride values, with one of the alternative values being re-selected every C repetitions of wear leveling. Selection can be performed using a round robin or random selection process, with a selected stride value being indicted by an associated change in a pointer, or a loading of a selected stride value into a proxy register. Such variable stride selection greatly enhances security, even above a baseline wear leveling process introduced earlier. Returning to the formulas presented above, these formulas still work for different stride values provided that the stride value is only changed at intervals of kC shuffling iterations, where k is a constant and where C is once again the lowest common integer multiple of each of M and M+N. In the example provided above (where there is no "unused" memory space and no change in the size of N), the stride value S can optionally be changed for enhanced security at intervals of 72 repetitions (C=8*9).

To again exemplify address translation using the formula introduced above, assume that it is desired at a point in time in between the wear leveling iterations 617 and 619 to read data from logical address IV. In this example, data at logical address VI was moved in the immediately previous wear leveling iteration from physical memory section 6 (see illustrative block 615) to physical memory section 1 (see illustrative block 617). Notably, FIGS. 6B and 6C provide tables 641 and 643 that are complement FIGS. 4B and 4C, but calculated for M=8 and a stride value of 5. Using these values from FIG. 6C in the second equation presented above, one obtains $$SPD=SL-SLA=30-20=10$$

$$SPA=SP-SPD=25-10=15$$

and, by reverse lookup to table 643, physical address 7. To use a different example, if the sought-after logical address was instead II, then with L=6, LA=2 and P=1, the returned physical address would be 5.

As should be appreciated therefore, the described methodology (a) facilitates fast address translation mechanism, obviating the need for an address translation (lookup) table, and (b) provides an address translation mechanism that can more readily scale with almost any size or density or memory. As will be further shown below, this algorithm can be easily integrated into hardware, meaning that a memory device can itself be charged with wear leveling or data scrambling, in a manner transparent to a memory controller. A schematic will be presented below in connection with FIG. 10 for hardware that performs translation using simple binary math, that is, without the requirement of function calls or complex circuitry that imposes significant latency. For example, based on that circuit, it should be possible to provide hardware translation with less than 2000 transistors, imposing a delay of about 1 nanosecond, using 45 nm process technology.

Other advantages of the presented teachings will also become apparent from further discussion below.

Figure 7:
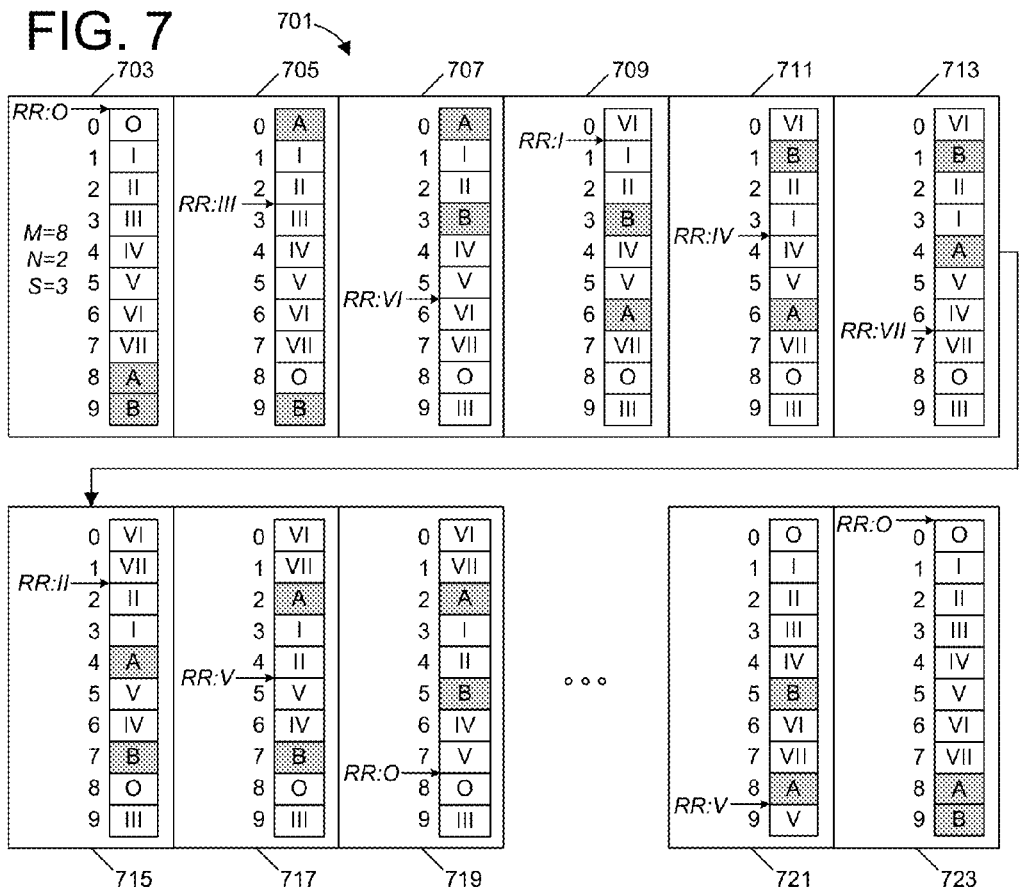
FIG. 7 is a memory allocation diagram similar to FIG. 4A, but where the number N of substitute blocks (highlighted in gray) is 2.

FIG. 7 provides a sequence 701 of illustrative blocks, similar to FIG. 4A. However, unlike the example of FIG. 4A, FIG. 7 uses a different size of substitute memory space. That is to say, in FIG. 7, N is equal to 2. While there are different ways in which such a memory storage scheme can be implemented, for the embodiment discussed in reference to FIG. 7, it should be assumed that each of N target sections in the substitute space at any point in time are used in a round robin fashion. In other words, the two substitute sections, denoted using labels "A" and "B," respectively, are each used in alternating wear leveling iterations, with the "oldest" substitute section being the recipient of copied (moved) data in the ensuing wear leveling/data shuffling iteration; in an iteration represented by the difference between illustrative blocks 705 and 703, substitute memory section "A" is used as the recipient of copied data, while in an iteration represented by the difference between illustrative blocks 707 and 705, substitute memory section "B" is used as the recipient for copied data. This process then repeats, with substitute section "A" being used in next used illustrated in the progression from illustrative block 707 to illustrative block 709, and so on. This process continues through all wear leveling/data shuffling iterations represented by illustrative blocks 703-723. Naturally, this example may be extended where more than two sections are reserved for use for substitute memory space—if a third section were also reserved, the last mentioned iteration would be applied to this section of memory, before a return to substitute section "A." As with the previous embodiment, the memory is returned to its original state after C shuffling iterations, that is, after a number of iterations equal to the lowest common multiple of M and M+N; in this case, since these values are 8, 10, respectively, illustrative block 723 represents the 40$^{th}$ shuffling or wear leveling iteration (since this is the smallest integer which is a common multiple of these values).

As should be apparent, occasionally changing N or S, or both N and S, provides significant optional security enhancements for every kC repetitions of wear leveling/data shuffling (where k is any integer); note that as N is changed, the value of C also potentially changes. For example, it was earlier demonstrated in connection with the examples discussed above that a different value for S (or for N) can drastically affect how logical space appears after a given number of shuffling or wear leveling iterations. Changing N or both S and N also affects the periodicity with which logical memory space assumes its original organization. For example, in the examples presented above, the change in N from 1 (FIG. 4A) to 2 (FIG. 7) changed the number of wear leveling iterations before shuffling resumed its original state (i.e., from 72 to 40). Clearly, with much larger typical values of M, much more significant variability in the data migration scheme can be obtained. The following table (Table 2) provides data showing the relationship between some hypothetical values for N and S.

TABLE 2

| N = 1 | | | | N = 3 | | N = 5 | |
|---|---|---|---|---|---|---|---|
| M | 511 | 1023 | M | 511 | 1023 | 511 | 1023 |
| S | 1 | 1 | Effective S | 3 | 3 | 5 | 5 |
| | 2 | 2 | | 6 | 6 | 10 | 10 |
| | 4 | 4 | | 12 | 12 | 20 | 20 |
| | 8 | 8 | | 24 | 24 | 40 | 40 |
| | 16 | 16 | | 48 | 48 | 80 | 80 |
| | 32 | 32 | | 96 | 96 | 160 | 160 |
| | 64 | 64 | | 192 | 192 | 320 | 320 |
| | 128 | 128 | | 384 | 384 | 129 | 640 |
| | 256 | 256 | | 257 | 768 | 258 | 257 |
| | | 512 | | | 513 | | 514 |

Changing N and/or S changes the effective stride used by the wear leveling/data shuffling scheme, i.e., the effective stride will be given by $Mod_M(N \times S)$. Note also that variation in N, for example, at intervals of kC wear leveling iterations, again increases security. For example, in one embodiment, illustrated by FIGS. 8A-8B, the substitute memory space can be varied by retaining a pool of reserved sections of memory (U sections); in such an embodiment, increases in the number N of substitute sections are drawn from these unused sections at every C wear leveling cycles or a multiple of C cycles. As mentioned, changing N potentially changes the value of C, since C is the smallest integer that is a common multiple of N and M+N. Note also that as was the case with stride value, a change can be made between predetermined, stored values, for example using a round robin or random process (e.g., N={1, 3, 5, 7, etc.}). It is also possible, even where memory device based hardware address translation is used, to have an operating system seed a value N or S by programming a value into a memory device register.

Figure 8A:
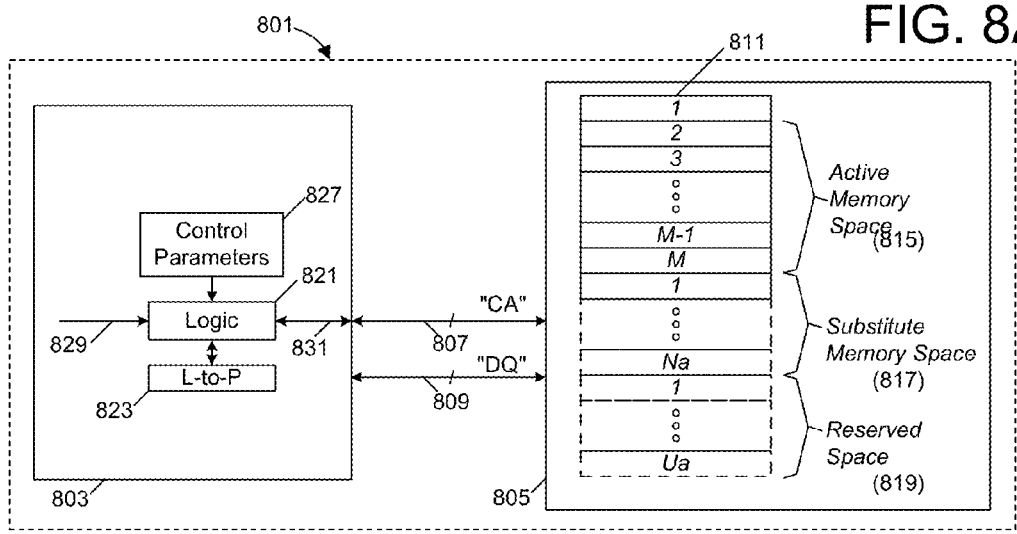
FIG. 8A shows a system diagram, used to introduce the notion of "reserved blocks" (e.g., blocks, Ua that are neither active nor substitute blocks for current wear leveling/data shuffling steps) and consequent ability to vary the wear leveling/data shuffling algorithm by occasionally changing the number of substitute blocks without changing active memory space.
Figure 8B:
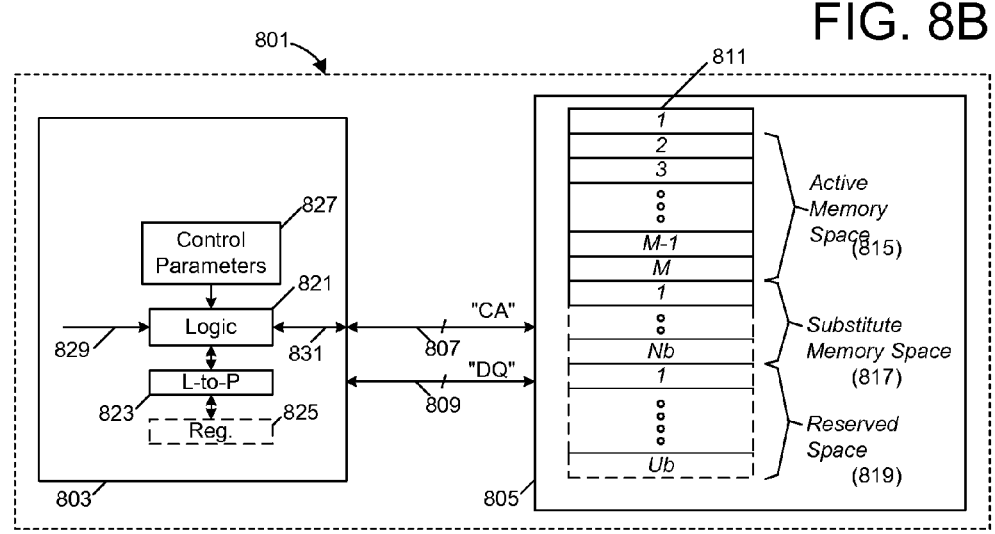
FIG. 8B shows a system diagram similar to FIG. 8A, but where the pool of potential substitute blocks has been increased (i.e., increased to Ub from Ua) at the expense of the number of reserved blocks (Na decreased to Nb).

FIG. 8A shows a memory system 801 having a memory controller 803 and a memory device 805. It will be assumed to simplify explanation that only one memory device is used, but of course, use of multiple such devices is also possible. The memory controller 803 uses a command bus 807 ("CA") to transmit commands and associated addresses to the memory device, with write or read data being exchanged via a data bus 809 ("DQ"). Either bus includes one or more pathways, with communications being single-ended or differential. The pathways are optionally physical, conductive pathways. The memory device includes an array of storage cells 811, with the array organized into an active memory space 815, a substitute memory space 817 and an optional reserved space 819, denoted using dashed lines. Each space 815/817/819 includes a respective number of sections; for example, the active space consists of M sections, the substitute space consists of N sections and the reserved space consists of U sections. In FIG. 8A, "$N_a$" is used to denote the number of sections in substitute memory space and "$U_a$" for reserved memory, with these values growing at the expense of each other; in FIG. 8B, these numbers are seen as changed to $N_b$ and $U_b$, indicating that some reserved space has been reassigned to substitute memory space, i.e., $N_b - N_a = U_a - U_b$. Section size is arbitrary depending on designed implementation, i.e., in the discussed embodiments, it should be assumed that each section is a single row of memory, but each section could be of different size, e.g., 2 rows, 10 rows, or a fraction of row size, e.g., a column of 64 memory cells. In FIG. 8B, numerals in common with FIG. 8A represent the same elements, i.e., FIG. 8B represents the same embodiment of FIG. 8A, but with changed values of a and b to reflect variation in the number of reserved and substitute sections.

In the depicted embodiment, it should be assumed that the memory controller 803 uses logic 821 to perform wear leveling and to manage command snooping (so as to substitute correct, physical addresses in commands sent outward on internal bus 831 for logical addresses arriving via internal bus 829, into memory access commands). The operation of the logic 821 is governed by control parameters 827, such as for example, whether wear leveling is to be performed and, if so, effectuating triggers for each wear leveling iteration. As before, the memory controller can rely upon a fast hardware address translation mechanism 823 and optional registers 825 to store a limited set of parameters used to track the performance of wear leveling/data shuffling and also to facilitate, fast, hardware-based, dynamic address translation.

Figure 9A:
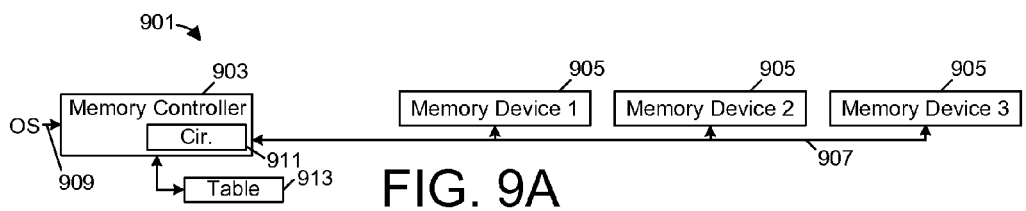
FIG. 9A shows a memory storage scheme where a memory controller uses an address translation table to perform address translation.

FIGS. 9A-E illustrate various system configurations that rely on address translation. For example, FIG. 9A shows a system 901 having a memory controller 903 and one or more memory devices 905 that are bidirectionally coupled to the controller via a signaling bus; the signaling bus may itself include address and/or data paths, bidirectional or unidirectional, and associated control signal paths such as timing paths, power rails and/or mask lines, as appropriate to the design. In one contemplated application, the signaling path includes printed circuit board traces or cabling compatible with currently prevalent standards, such as SATA 3.0 or PCI express 3.0, including both bidirectional and unidirectional signaling paths. Memory commands are generally triggered by a master operating system ("OS") which communicates with the memory controller via signaling path 909. FIG. 9A also depicts circuitry 911, which processes commands from the memory controller to any attached memory device, and address translation table 913, which stores a current mapping of logical to physical addresses. This table can be stored within cache in the memory controller, but more typically is stored off chip due to its size for large capacity memory. The embodiment depicted in FIG. 9A implements data scrambling or wear leveling as introduced earlier, and performs address translation using conventional techniques such as a continually updated address translation (lookup) table. This table stores a 1-1 mapping of each logical address to a physical address and can be very large when memory capacity is large, as mentioned earlier.

Figure 9B:
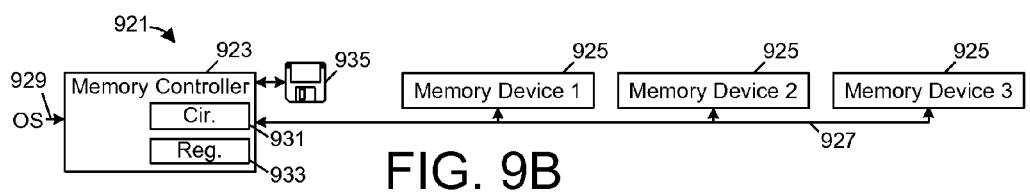
FIG. 9B shows a memory storage scheme where a memory controller uses instructional logic and registers to perform fast address translation.

In an alternate embodiment, represented by FIG. 9B, instructional logic 935 is still used to perform address translation. However, instead of using a large address translation table, a memory controller 923 relies on a small set of parameters to dynamically compute physical address, that is, at the time a memory access command is presented. The address translation can therefore be equation-based, wholly obviating the need to store and update a lookup table. In this case, the registers 933 store the parameters mentioned earlier (e.g., "S," "L," "X," "RR," "P" and/or other parameters as appropriate), and instructional logic is operative to control circuitry 931 so as to perform calculations (described in detail below) to compute PA from LA. As with the embodiment of FIG. 9A, the system also includes memory device 925, which communicates with the memory controller via a communications bus 927, and a path 929 for communicating with an operating system or other master.

Figure 9C:
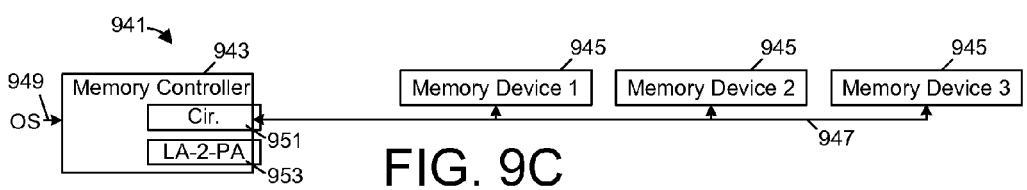
FIG. 9C shows a memory storage scheme where a memory controller uses hardware logic to perform address translation; this logic includes a wear leveling or data scrambling circuit ("Cir.") to manage data movement, and logical-to-physical translation circuitry ("LA-2-PA") to provide for fast address translation.

FIG. 9C shows another system 941. This system also includes a memory controller 943 and a plurality of memory devices 945, coupled to the memory controller via a system bus 947. As before, each of the memory controller and memory devices are optionally integrated circuit devices, that is flip-chip or package-mounted dies, and the bus is optionally a set of printed circuit traces that provide a conductive path coupling these elements. In this system 941, the memory controller 941 includes circuitry 951 that manages data and processes commands from CPU or operating system (per numeral 949). Unlike the previous system, however, the memory controller 943 includes on board fast hardware translation mechanism 953 (i.e., hardware logic) to perform logical-to-physical address translation ("LA-2-PA"). That is, circuitry 951 processes commands from the operating system or a master CPU, and retransmits those commands as appropriate to the memory devices 945; the circuitry 951 detects a logical address associated with those commands, and it uses the fast hardware translation mechanism 953 that compute a correct physical address from that logical address. Circuitry 951 then substitutes the true (physical) address into the commands before transmitting those commands to the memory devices 945. Although not separately identified in FIG. 9C, the memory controller 943 also includes registers that store individual parameters as mentioned above, i.e., that enable the fast hardware translation mechanism 953 to dynamically compute physical address. That is, this hardware translation mechanism 953 computes physical address with relatively constant, short latency, without requiring support of an address translation table. This enhances the ability of a system to pipeline memory commands.

Figure 9D:
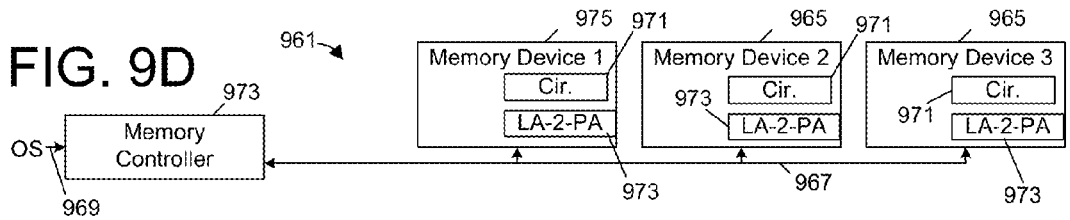
FIG. 9D shows a memory storage scheme similar to FIG. 9C, but where each memory device comprises an instance of the hardware logic.

FIG. 9D shows yet another system 961. This system also uses a memory controller 963, one or more memory devices 965, and a connecting bus 967. Unlike the previous systems, however, the address translation circuitry is seen to reside within each individual memory device. That is to say, one or more of the individual memory devices 965 each have circuitry to process incoming commands and hardware translation to dynamically compute physical address from logic address. The system bus 967 and operating system link 969 are similar to those described earlier and so are not repeated in detail here.

Reflecting on the advantages and benefits of system 961 relative to the previously described systems, it is noted that system 961 can perform wear leveling in a manner entirely transparent to the memory controller. This is to say, circuitry 971 is be given sole control over wear leveling using and updating of parameters; the memory controller simply issues commands and has a perspective that data is always stored in accordance with logical address space.

Also, note that each of the described systems provides improved security against use-based attacks, that is, attacks made via software to cause memory to fail through heavy use of a specific physical memory location. Any such attack, because it arises in software, would be subject to logical to physical memory translation, and so, even the attacks would be scrambled in terms of affected physical location.

Figure 9E:
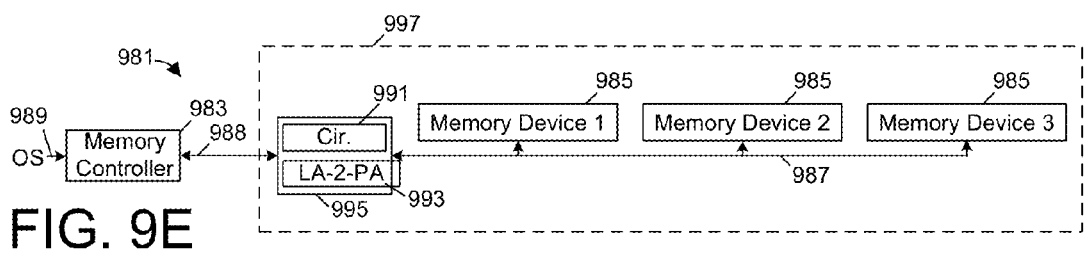
FIG. 9E shows a memory storage scheme similar to FIG. 9C, but where a separate chip comprises the hardware logic.

FIG. 9E provides another variant on these principles. As with earlier systems, FIG. 9E provides a system 981 that includes a memory controller 983, one or more memory devices 985 and a system bus 987. However, in this system 981, the circuitry 991 and fast hardware translation mechanism 993 are located in a different integrated circuit 995, apart from either memory controller or memory device integrated circuits. In such a system, part or all of the system bus is essentially split into two sections 987 and 988, with the integrated circuit 995 snooping commands from bus section 988 and substituting physical address for logical address. As indicated by phantom line 997, the memory devices 985, bus section 987 and integrated circuit 995, are optionally mounted to a common board, for example, forming a memory module. The bus section 988 couples the memory controller with a physical interface slot or connector, with edge connectors or a mating physical interface for the board coupling bus section 988 with integrated circuit 995 and bus section 987. Note that the integrated circuit 995 can optionally be instantiated as multiple integrated circuits or be combined with other functions; for example, some or all the parameters used for fast hardware address translation could be obtained from or stored in a serial presence detect register (e.g., in a memory module embodiment). Other combinations are also possible.

The system of FIG. 9E carries with it many of the same advantages described above for systems 901, 921, 941 and 961; as should be apparent, however, having circuitry 991 and fast hardware translation logic removed from the memory devices 985 permits optional movement of blocks of data between different memory integrated circuits. This is to say, each of physical and logical space can be manages as a single virtual device. The same is also true for the embodiments of FIGS. 9A-9C.

Notably, each of these embodiments of FIGS. 9A-E provide a possible implementation for the memory storage scheme introduced by FIGS. 1-8.

Having described some basic system level implementation options, this description will now further explain data movement principles that facilitate fast hardware translation logic.

IV. Application of Dynamic Address Translation to Hardware

Figure 10:
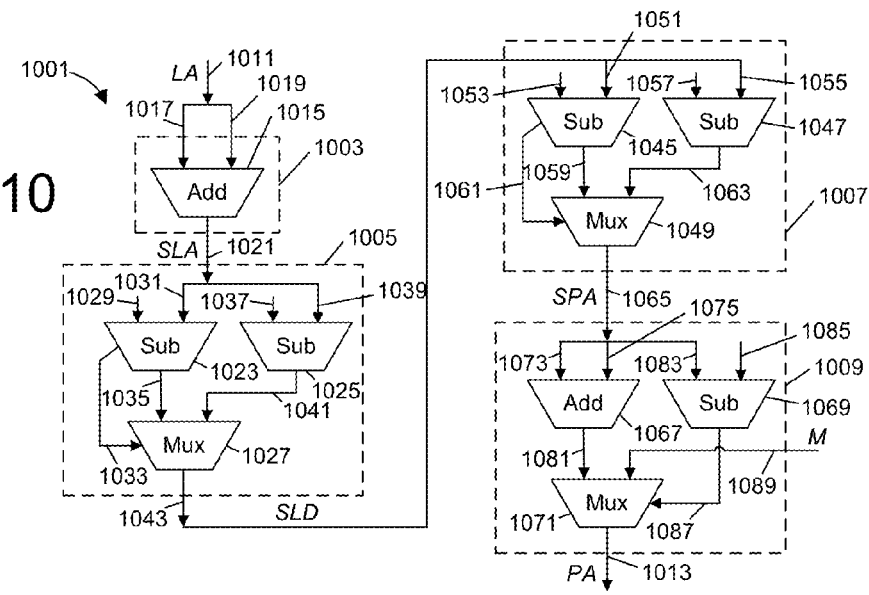
FIG. 10 illustrates a circuit diagram for a hardware-based fast address translation mechanism.
Figure 11:
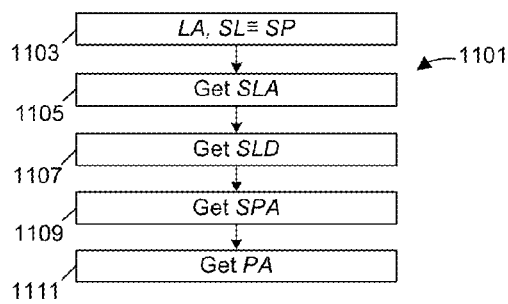
FIG. 11 shows a method corresponding to circuit blocks from FIG. 10.

FIGS. 10-11 provide a specific hardware-based address translation circuit. Other hardware implementations are also possible, but where M is selected to a Mersenne number (i.e., M is selected to be a power of two, minus one) and stride value S is selected to be a power of two, the hardware can be designed to provide translation using simple shift and addition operations. Such a design facilitates a relatively quick, low power address translation circuit, and will be discussed with reference to FIGS. 10-11.

FIG. 10 shows a schematic 1001 of a circuit where the active memory space (M) in units of memory sections is a Mersenne number ($2^N-1$) and where the stride value S is a power of two ($S=2^r$). As mentioned, this design permits multiplication via simple shift operations. Four circuits blocks 1003, 1005, 1007 and 1009 in FIG. 10 respectively perform operations of:

(a) scattering a provided logical address LA (e.g. sought by an incoming memory access command) into stride address space (SLA);

(b) calculating distance in stride address space SLD between the stride address (SL) of the last-moved data block and the stride address of the provided logical address (LA), by subtracting SLA from SL;

(c) calculating the stride physical address SPA by effectively subtracting the distance in stride space from SP, i.e., SPA=SP−(SLD); and (d) determining the physical address PA of the data sought by the memory access command by reverse-calculating an address from stride address space, i.e., from SPA.

That is, with an input 1011 carrying the desired logical address LA, an output 1013 provides the desired physical address PA.

The first circuit block computes stride logic address SLA according to the equation $$SLA=\{LA[r-1,0],m'b0\}+\{LA[m-1,r],r'b0\}.$$

In connection with the notation above, square brackets designate bits in a binary implementation, e.g., the first left-most half of the formula above indicates that an m-bit logical address LA is left shifted by m−r bits and padded with m trailing zeros to obtain $\{LA[r-1,0],m'b0\}$, i.e., a value m+r bits in length. The address LA is then added to this with the r least significant bits set to zero, to obtain the value SLA.

When a desired logical address LA arrives at the input 1011 in the form of m bits, the first circuit block 1003 passes this address into a simple binary addition circuit 1015 via two paths. A first path, 1017, represents the m+r bit value of $\{[m-1],r]r'b0\}$, whereas a second path, 1019, represents the m+r bit value of $\{[r-1],0],m'b0\}$. These values are then added by circuit 1015 to generate an output 1021. The effect of this operation is to scatter the desired logical address LA into stride space, producing the stride logical address SLA as the output 1021.

The second circuit block 1005 receives this output 1021 and calculates distance in stride space by subtracting it from SL, designated by numeral 1029. The value SL can be precalculated from a prior wear leveling operation or dynamically calculated using simple binary logic; again, this is an advantage of selecting the stride value S to be a power of 2. The second circuit block 1005 thus calculates the value $$SLD=\text{Mod}_{M \times S}(SL-SLA)$$

using two subtraction circuits 1023 and 1025 and a multiplexer 1027. In this regard, the value SL is received as a first input 1029, and the value M×S+SL as an input 1037; the subtraction circuits subtract SLA (respective inputs 1031/1039) from each of these values. Notably, if the distance is negative (i.e., SLA>SL), a carry signal 1033 from subtraction circuit 1023 output causes multiplexer to select between outputs 1035 or 1041 to provide a modulo complement, i.e., SL+M×S-SLA. A second circuit block output signal 1043 then represents the value of SLD.

The third circuit block 1007 is nearly identical in configuration to the second circuit block. That is, it also relies on two subtraction circuits 1045 and 1047 and a multiplexer 1049. The first subtraction circuit 1045 subtracts the value SLD (1051) from input 1053 (i.e., SP) and the second subtraction circuit 1047 subtracts the value SLD (1055) from input 1057 (i.e., SP+(M+1)×S), assuming N=1. Once again, the first subtraction circuit 1045 provides a carry output 1061 to cause multiplexer 1049 to select the output 1063 from the second subtraction circuit 1047 instead of output 1059 if SLD>SP, generating the (M+1)×S modulo complement of SP−SPD. As a result, the third circuit block will output the value SPA, representing the desired physical address in stride space. That is to say, the third circuit block calculates $$SPA=\text{Mod}_{S \times N+M \times S}(SP-SLD).$$

In many embodiments, N can be selected to be 1; N can also be selected to be greater than one or it can be periodically varied, as described earlier.

The fourth circuit block 1009 simply converts the stride physical address SPA to the desired physical address PA. That is, it picks $$PA = \begin{cases} SPA[m+r-1, r] + SPA[r-1, 0], & \text{for } SPA < M \times S \\ M, & \text{for } SPA = M \times S \end{cases}$$

To this end, it uses an addition circuit 1067, a subtraction circuit 1069 and a multiplexer 971. The addition circuit 1067 receives inputs 1073 and 1075, respectively representing the highest m bits and lowest r bits of SPA (SPA consisting of m+r bits); this operation performs the inverse operation of first circuit block 1003. In other words, it obtains an address from the stride address per an effective reverse lookup process, as described earlier using FIGS. 4C and 6C as examples. Should SPA be equal to M×S (i.e., input 1083 is equal to input 1085), the second subtraction circuit 1069 yields an output 1087 that causes multiplexer 1071 to output M (input 1089) instead of the output 1081 of the addition circuit.

Reflecting on the operation of these circuits, is it noted that configuring mathematical operations as simple shift and add operations (or subtract operations) enables a lightweight circuit operation to provide immediate, on the fly, hardware based address translation. As noted earlier, with 45 nm process technology, such a binary circuit design can be achieved with approximately 2000 transistors or gates, imparting an approximate delay of 1 nanosecond. This delay scales well with increases in memory size and provides for easy pipelining of memory commands.

FIG. 11 provides a method block diagram 1101 corresponding to the circuit just described. That is to say, the methodology is broken up in to a number of process steps, respectively indicated using numerals 1103, 1105, 1107, 1109 and 1111. First, the desired logical address is retrieved and the values SL and SP are calculated. Second, the stride logic address SLA is calculated from these values, per numeral 1105. Third, distance from the last rotated logic block is calculated in stride address space, that is, SLD is calculated as SL−SLA, with SPD being is equal to SLD. Fourth, the stride physical address SPA is calculated from these values based on the rule that distance in stride space between any two logic addresses corresponds to distance in stride space between the corresponding physical addresses. Finally, per numeral 1111, the physical address PA is calculated from the stride physical address SPA and substituted into a memory access command. These techniques can be implemented in any of the embodiments seen in FIGS. 9A-9E.

V. RRAM and the Use of Wear Leveling Combined with Refresh Operations

Figure 12:
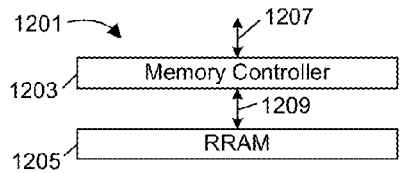
FIG. 12 shows a block diagram of a memory system that uses at least one RRAM memory device.

One contemplated application of the techniques described above is to a system based in RRAM. Such an application is seen in FIG. 12, which shows a system 1201 having a memory controller integrated circuit 1203 and a RRAM integrated circuit 1205; the memory controller integrated circuit communicates with a master or system interface using a first bus 1207, and it relays commands as appropriate to the RRAM integrated circuit via a memory bus 1209. This embodiment is easily extended to other forms of memory, volatile or nonvolatile. For example, newer memory architectures are being developed that have properties where cell state is manifested by a change in physical materials; these newer architectures are known by a variety of names, including without limitation magnetic random access memory (MRAM), flash, SONOS, phase change random access memory (PCRAM), conductive bridging RAM (CBRAM), ReRAM (also generally designating resistive RAM), metalized RAM, nanowire RAM, and other names and designs. The techniques provided above are also applicable to conventional volatile memory types such as DRAM. That is to say, wear issues affect conventional DRAM in the same manner that these issues affect flash memory, but with DRAM the wear is far less noticeable because it takes millions of times as much wear as flash to impact data retention to a point where DRAM memory cells become unreliable. Many of the above-mentioned newer memory types can be expected to have wear issues that lie in between those of flash memory and DRAM and sometimes also present even greater issues than flash memory.

Figure 13:
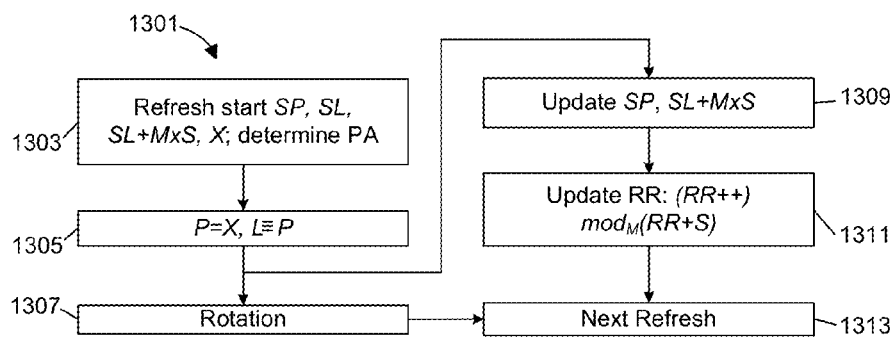
FIG. 13 shows a method where wear leveling is integrated with refresh operations.

FIG. 13 illustrates a method 1301 where wear leveling is integrated with refresh operations. That is, each time a refresh operation is performed in this embodiment, wear leveling/data shuffling is performed; rather than a refresh operation writing back contents of a memory row to the same physical location, it instead writes the row to a row drawn from substitute memory space and recycles the "donor" row from active memory space into the substitute memory space. As the start of such an operation, as represented by block 1303, the method retrieves the values of SP, RR, SL and X. For example, this method can be implemented directly in an RRAM integrated circuit device or other memory device, which pre-calculates values such as SP, SL, M×S+SL, as mentioned for the embodiment of FIG. 10, above. Having these values "on-hand" permits control logic to translate an address for the refresh operation, to identify the correct refresh operand. X in this example is the physical address of the reserved (spare) section that will act as a recipient of data in next the refresh operation. Per numeral 1305, the then calculates new values for L, P, X and RR based on the rotation or wear leveling that is taking place. The method then branches into two paths, i.e., as indicated by numeral 1307, the system performs wear leveling/refresh by writing data from logical address associated with RR into physical address X; in parallel with this path, the system also updates (per block 1309) the pre-calculated values SP, SL, M×S+SL for any ensuing address translation (and for any ensuing refresh operation, e.g., as part of a burst refresh). It also at this time updates the logical address held by the rotation register by increasing RR by the stride value, modulo M (step 1311). Finally, the method terminates at block 1313; the system is then ready for a return to normal data operations or performance of another refresh operation.

Refresh is an example of a memory operation that can be combined with wear leveling using the teachings of this disclosure; there are also other types of memory operations that can be combined, including without limitation atomic operations.

VI. Conclusion

What has been described is a set of techniques for shuffling memory space for wear leveling or other purposes, as well as a system or device that uses fast address translation. These techniques and system/device can respectively be used in concert with one another or independently. In addition, a specific algorithm has also been presented that provides an equation-based approach to address translation, substantially eliminating the need for a bulky address translation table. The appendix set forth below provides a comprehensive mathematical treatment of one such specific approach in a manner that enables one with skill in electronics to design a wide variety of address translation systems based on the techniques set forth in this disclosure. Especially when implemented in hardware using simple binary operations, these techniques can substantially eliminate the latencies associated with address translation. Variations in these designs, such as the use of other equations for address translation or wear based leveling, will readily occur to those who design electronics in view of the teachings provided above, or in view of the claims set forth below.

Accordingly, the foregoing discussion is intended to be illustrative only; other designs, uses, alternatives, modifications and improvements are also possible which are nonetheless within the scope of the present disclosure, which is limited and defined only by the following claims and equivalents thereto.

VII. Appendix.

Dynamic Address Mapping of Variable Stride Circular Block Rotation

1. Terminology

The following are major terminology used in the discussion below.
- $A$: Address
- $LA$: Logical Address
- $PA$: Physical Address
- $M$: Number of logically addressable blocks, i.e., size of "active" memory space and number of physical memory sections used to house the corresponding data
- $N$: Number of substitute memory sections (e.g., rows)
- $S$: Stride, S and M are coprime*
- $fstride(A, M, N, S)$: A mapping function based on address input $A$, the number of logically addressable blocks $M$, number of substitute sections $N$, and stride value $S$
- $SA$: Stride Address obtained from the mapping function $fstride()$ applied to an address input $A$
- $SLA$: Stride Logical Address obtained from the mapping function $fstride()$ applied to the address input $LA$
- $SPA$: Stride Physical Address obtained from the mapping function $fstride()$ applied to the address input $PA$
- $D$: Stride address distance between two addresses in the same (i.e., logical or physical, stride or non-stride) address space
- $LD$: Stride address distance between two logical addresses
- $PD$: Stride address distance between two physical addresses
- Address spaces: Logical address space, Physical address space, Stride logical address space and Stride physical address space
- $L \equiv P$: Address mapping of logical address $L$ to physical address $P$ resolved by last rotation
- $LL$: Logical address of the last-moved block of data, i.e., that data copied or moved during the previous wear leveling/data shuffling operation

*Coprime: Two integers a and b that have no common positive factor other than 1, or, equivalently, their greatest common divisor is 1.

2. Stride address mapping

For a given block's address input $A$, the block's stride address $SA$ is obtained from the mapping function $fstride(A,M,N,S)$ $$SA = \mathit{fstride}(A,M,N,S) = Mod(A+a \times M, (M+N) \times S) = Mod(b \times S, (M+N) \times S) \quad (a,b \geq 0) \quad (2)$$

$$(A + a \times (M+N)) \leq (M+N) \times S \quad \rightarrow \quad a \leq \frac{(S \times (M+N) - A)}{M+N} < S$$

$$b = \frac{(A + a \times (M+N))}{S} \quad \text{and} \quad a < S$$

$$\text{For} \quad S = 1 \quad \rightarrow \quad a = 0 \quad \rightarrow \quad SA = A$$

Note that the terminology $Mod(F,G)$ is equivalent to $Mod_G(F)$. Here, $a$ is an arbitrary integer representing an offset or distance and $b$ is related to $a$ based on the equation just indicated. Where the equation is being used to calculate the stride address of a logical address (i.e., where it is being used to calculate $SLA$), $N$ is taken to be $0$. From equation (2), the logical address $L$ (e.g., for a last-moved block of data) and any desired logical address $LA$ following the next wear leveling/data shuffling iteration respectively produce stride addresses $SL$ and $SLA$:

$$SL = \mathit{fstride}(L,M,0,S) \quad (3)$$
$$SLA = \mathit{fstride}(LA,M,0,S) \quad (4)$$

From equation (2), the physical address $P$ and the sought after physical address $PA$, corresponding to the desired logical address $LA$ are obtained by computing stride address $SP$ and $SPA$ using the stride algorithm, i.e., according to $$SP = \mathit{fstride}(P,M,N,S) \quad (5)$$
$$SPA = \mathit{fstride}(PA,M,N,S) \quad (6)$$

In these equations, the logical address $L$ and the physical address $P$ are a mapped pair of addresses following the last wear leveling/data shuffling operation (e.g., following the last refresh in an embodiment that performs wear leveling with each data refresh operation; the notation $L \equiv P$ is used to represent this relationship.

3. Address spaces

Four address spaces employed in the method are as follows:
- Logical address space (LAS): a continuous address space having $M$ data blocks; this space is stored in an "active" set of memory sections (e.g., rows); not all of this space need contain data, but this space represents the space actively used by the system for potential storage of data.
- Physical address space (PAS): a continuous address space corresponding to $M+N$ sections of memory; Logical to physical address space mapping is defined by a mapping function
    $$PA = P(LA) \quad (7)$$
- Stride logical address space (SLAS): a non-continuous address space with $M$ blocks, in which adjacent blocks have a gap of $S$; converted from logical address space by the formula $$SLA = fstride(LA, M, 0, S) \quad (4)$$

- Stride physical address space (SPAS): a non-continuous address space with $M+N$ blocks or sections, in which adjacent blocks have a gap of $S$; converted from physical address space by the formula $$SPA = fstride(PA, M, N, S) \quad (6)$$

4. Stride circular block rotation

Definition 4.1:
*Stride circular block rotation is a circular policy for moving the logical blocks with a defined stride $S$, under which one block's logical address $L$ is $S$ ahead of the previously-moved block's logical address $LL$ in circular fashion with $M$ blocks, and the destination "substitute" section is the first available spare section of physical memory having of physical address $X$. $S$ and $M$ are coprime.*

The definition of dynamic address mapping via stride circular block rotation can be explained based on four observations:

(1) Block $LL$ has a physical address mapping of $LP$; $L$ has a physical address mapping of $P$; the logical address space has $M$ addressable blocks from $0$ to $M-1$;

$$LL \equiv LP, L \equiv P \quad (7)$$

(2) Substitute sections of memory provide a destination for moved/copied data, , i.e., $N$ physically addressable blocks with a sequence of $X$ to $X+N-1$, with respective stride physical address mappings of $SP(X)$ to $SP(X+N-1)$; the first available spare block is $X$, with a stride physical address $SP(X)$;

$$X \equiv SP(X), X+N-1 \equiv SP(X+N-1) \quad (8)$$

(3) At the time of last data moving, $LL \equiv LP$, $L \equiv P$, $X \equiv SP(X)$, and $$L = Mod(LL + S, M) \quad (9)$$

(4) After the time of last data moving, the address mapping changes to
  When $N = 1$,
  The substitute section $X$ is mapped to the physical address of last moved block's logic address $LL$, so $P(X) = P(LL)$. It is because in the last move, logic data block $LL$ is moved out and the physical address $P(LL)$ becomes the new spare section $X$. After the current data move, we get $$P(X) = P(LL)$$
$$L \equiv P(X)$$
$$L \equiv P(LL) \quad (10)$$

When $N > 1$,

The substitute section $X+N-1$ is mapped such that $P(X+N-1) \equiv P(L_{Nth})$. After the current data move, we get $$P(X+N-1)=P(L_{Nth})$$
$$L \equiv P(X)$$
$$L \equiv P(L_{Nth})$$

Where
$SP()$ is the mapping function of stride logic to stride physical address mapping Address mappings for different address spaces are summarized as follows:
- $LA \equiv SLA$: Address mapping of logical address $LA$ to stride logical address $SLA$
- $PA \equiv SPA$: Address mapping of physical address $PA$ to stride physical address $SPA$
- $LA \equiv PA$: Address mapping of logical address $LA$ to physical address $PA$
- $SLA \equiv SPA$: Address mapping of stride logical address $SL$ to stride physical address $SPA$
- $L \equiv P$: Address mapping of logic address $L$ to physical address $P$ resolved by last data moving

5. Stride address distance

Definition 5.1:
*Stride Address Distance is defined as the stride address difference between two addresses within a given address space.*

For two given blocks with addresses $A$ and $B$ in same address space of $M$ blocks, $N$ spare blocks, and $S$ stride, the stride address distance between $A$ and $B$ is $$D = \| A - B \| = \frac{Mod(SA - SB, Y \times S)}{S} \quad (11)$$

Where $SA = fstride(A, M, N, S)$ and $SB = fstride(B, M, N, S)$
and where $Y$ represents the size of the pertinent address space, i.e., $M$ or $M+N$.

For two blocks with logical addresses $L$ and $LA$, and corresponding physical addresses $P$ and $PA$, the logical stride address distance $LD$ and the physical stride address distance $PD$ are $$LD = \| L - LA \| = \frac{Mod(SL - SLA, M \times S)}{S} \quad (12)$$

$$PD = \| P - PA \| = \frac{Mod(SP - SPA, (M+N) \times S)}{S} \quad (13)$$

Where
$L \equiv P$ and $LA \equiv PA$

Definition 5.2
*Natural address mapping is the address mapping of a logical address to physical address, where the two address spaces are unscrambled relative to one another, where M is the initial*

*physical address of the first available spare block, where M is the number of logically addressable blocks.*

Lemma 5.1 *For a system starting with natural address mapping, given a logical to physical address mapping LL≡LP produced at the last block rotation via stride circular block rotation, for any block with logical to physical address mappings LA≡PA, the stride address distance between L and LA equals the stride address distance between P and PA. S and M are coprime.*

Proof:

From definition 5.2 of natural address mapping and $LL$, the initial mapping pair by pseudo block rotation is $L \equiv P$ where $$L = mod(LL+S, M) \text{ and } P = mod(LL+S, M+N)$$

From definition 4.1 (dynamic address mapping via stride circular block rotation) and equations (7), (8), (9) and (10), for block address $L$, whose physical address mapping is P, and block address $LL$, whose physical address mapping is $LP$, $$LL \equiv LP, L \equiv P, X \equiv P(X)$$

And, from equation (9)

$$L = Mod(LL + S, M)$$

When N = 1,

The substitute section X is mapped to the physical address of last moved block's logic address $LL$, so $P(X) = P(LL)$. It is because in the last move, logic block $LL$ is moved out and the physical address $P(LL)$ is the new spare block $X$. After the current data moving, we can get $$P(X) = P(LL)$$
$$L \equiv P(X)$$
$$L \equiv P(LL) \qquad (10)$$

Let $L_j$ be the logical address of the *j*th last-moved block, whose physical address mapping is $P_j$, then $$L_j \equiv P_j = P(L_{j+1}) \quad 0 \le j \le M - 1$$

Where $$L_j = LL \equiv P_j = LP$$
$$L_0 = L \equiv P_0 = P = P(L_1) = P(LL)$$

So, for any give block with a logical-to-physical address mapping $LA \equiv PA$ $$LA = Mod(L + j \times S, M) \quad 0 \le j \le M - 1 \quad (14)$$
$$LA \equiv PA = P(L_{j+1}) \quad 0 \le j \le M - 1 \quad (15)$$
$$\text{And} \quad L \equiv P = P(L_1) \qquad (16)$$

From the definition 5.1, definition 5.2 and equation (14), the stride address distance between $L$ and $LA$ is $j$, then
$$LD = ||L\text{-}LA|| = || L - Mod(L + j \times S, M) || = j$$

From the equations (15) and (16), the rotation sequence of physical addresses is correlated with the rotation sequence of logical addresses, so that the stride address distance between $P$ and $PA$ is $j$, then
$$PD = ||P\text{-}PA|| = || P(L_1) - P(L_{j+1}) || = j$$
So
$$LD = PD \qquad (17)$$

*When $N > 1$,*
The spare block $X+N-1$ is mapped to the physical address of the $Nth$ last moved block's logic address $L_{Nth+1}$, so $P(X+N-1) \equiv P(L_{Nth+1})$. After the current data moving, we can get $$P(X+N-1) = P(L_{Nth+1})$$
$$L \equiv P(X)$$
$$L \equiv P(L_{Nth+1})$$

Let $L_j$ is the logic address of the $jth$ last moving block's logic address, whose physical address mapping is $P_j$ ; and N is the total reserved blocks, then $$L_j \equiv P_j = P(L_{j+1}) \qquad 0 \le j \le M-1$$

For any give block with logic to physical address mapping $LA \equiv PA$
$$LA = Mod(L + j \times S, M) \quad 0 \le j \le M-1$$
$$LA \equiv PA = P(L_{Nth+j+1}) \quad 0 \le j \le M-1$$
And $L \equiv P = P(L_{Nth+1})$ From the definition 5.1, definition 5.2 and equation (14) and (15), the stride address distance between $L$ and $LA$ is $j$, then
$$LD = ||L\text{-}LA|| = || L_{Nth} - Mod(L_{Nth} + j \times S, M) || = j$$

The rotation sequence of physical addresses is correlated with rotation sequence of logic addresses, so the stride address distance between $P$ and $PA$ is $j$, then $$PD = ||P\text{-}PA|| = || P(L_{Nth+1}) - P(L_{Nth+j+1}) || = j$$
So
$$LD = PD$$

6. Physical address mapping

From Lemma 5.1, *the initial condition of stride circular block rotation* can be summarized as:
- Natural address mapping
- Initial last logical rotating address $LL$
- Initial mapping pair by pseudo block rotation is
  $$L \equiv P$$
  Where
  $$L = mod(LL+S, M) \text{ and } P = mod(LL+S, M+N)$$
- Initial condition can be extended any address mapping according to Lemma 5.1

Given a logical-to-physical address mapping produced at the last data move under dynamic address mapping via stride circular block rotation:
$$L \equiv P$$
For any logical-to-physical address mapping
$$LA \equiv PA$$
Then the address distance between $L$ and $LA$ equals the stride address distance between $P$ and $PA$, $LD = PD$ From (1) to (6):
$$SL = fstride(L, M, 0, S) \quad (3)$$
$$SLA = fstride(LA, M, 0, S) \quad (4)$$

From (12), (13) and (17):
$$LD = PD = \| P - PA \| = \frac{Mod(SP - SPA, (M+N) \times S)}{S} = \frac{Mod(SL - SLA, M \times S)}{S}$$
$$SPA = Mod(SP - LD \times S, (M+N) \times S) \quad (18)$$
$$PA = \begin{cases} Mod(SPA, M) & (SPA < M \times S) \\ SPA/S & (SPA \geq M \times S) \end{cases} \quad (19)$$

Combining:
$$SPA = Mod(SP - Mod(SL - fstride(LA, M, S), M \times S), (M+N) \times S) \quad (20)$$

$SP$ and $SL$ can be produced at the time of block rotation; and $(M+N) \times S$ and $M \times S$ are related to the configuration (e.g., start of $C$ intervals of a given S, M and N, and can be produced at the time of configuration of these $C$ cycles or intervals).

\* $SPA$ can be also explained as
$$SPA = Mod(fstride(P, M+N, S) - Mod(fstride(L, M, S) - fstride(LA, M, S), M \times S), (M+N) \times S)$$

7. Stride circular block rotation period

Lemma 7.1 *For a memory system enabling a stride circular block rotation policy with M logical blocks, N substitute blocks, where C defined as the least common multiple of M and M+N, for a*

*given address mapping set Φ of logical to physical addresses, after C rotations that follow the policy of stride circular block rotation, the address mapping set is restored to Φ.*

Proof:

For a memory system enabling a stride circular block rotation policy with $M$ logical blocks and $N$ substitute blocks, every $M+N$ continuous rotations, each spare row touches all physical slots.

Within these $M+N$ continuous rotations, given a physical address $P$, (1) If $N$ is not a factor of $M$,
All $M$ logical blocks can be mapped to $P$.
The number of different logical-to-physical mapping sets is $M \times (M + N)$, which is the least common multiple of $M$ and $M+N$.

(2) If $N$ is a factor of $M$,
$M/N$ logical blocks can be mapped to P
The number of different logical-to-physical mapping sets is $\frac{M}{N} \times (M + N)$, which is the least common multiple of $M$ and $M+N$.

For C is the least common multiple of M and M+N, C rotations will go through all possible logic to physical mapping sets.

So, for a given address mapping set Φ of logical-to-physical addresses, after C rotations that follow the policy of stride circular block rotation, the address mapping set restores to Φ.

Definition 7.1
*Stride circular block rotation period is the number of rotations, after which the logical-to-physical address mapping set is restored.*

From lemma 7.1 and definition 7.1, we get lemma 7.2

Lemma 7.2 *For a memory system enabling a stride circular block rotation policy with M logic blocks and N substitute blocks, the stride circular block rotation period is C, where C is the least common multiple of M and M+N.*

From lemma 7.1, definition 7.1 and lemma 7.2, the same logical-to-physical address mapping changes repeat every stride circular block rotation period, and the number of distinct logical-to-physical address mapping sets is the least common multiple of M and M+N.

Two cases derived from lemma 7.2:

For the case that $N$ equals to 1,
the stride circular block rotation period is $M \times (M+1)$, which means that the same logical-to-physical address mapping changes repeat every $M \times (M+1)$ block rotations.

For the case that $N$ is not a factor of $M$,
the number of different logical-to-physical mapping sets is $M \times (M+N)$, which means that the same logical-to-physical address mapping changes repeat every $M \times (M+N)$ block rotations

8. Case study I

Given a logical-to-physical address mapping produced for the last data movement under dynamic address mapping via stride circular block rotation: $L \equiv P$. For any logical-to-physical address mapping: $LA \equiv PA$.

For the case of $S=1$(stride is 1), from (2) we get $$\begin{aligned}
For \quad S &= 1 \quad then \quad SA = A \\
SL &= L \\
SP &= P \\
SLA &= LA \\
SPA &= PA
\end{aligned}$$

$$LD = Mod(L - LA, M)$$
$$PD = Mod(P - PA, M + N)$$
$$For \quad L \equiv P \quad then \quad LD = PD$$
$$\begin{aligned}
SPA &= Mod(SP - S \times PD, M + N) \\
&= Mod(P - LD, M + N) \quad (21)
\end{aligned}$$

And $$\begin{aligned}
PA &= Mod(SPA, M+N) = Mod(P - LD, M+N) \\
&= Mod(P - Mod(L - LA, M), M + N) \quad (22)
\end{aligned}$$

9. Case study II

Given a logical-to-physical address mapping produced for the last data movement under dynamic address mapping via stride circular block rotation: $L \equiv P$. For any logical-to-physical address mappings: $LA \equiv PA$.

For the case of $N=1$(single spare block), equation (19) can be simplified to $$PA = \begin{cases} Mod(SPA, M) & (SPA < M \times S) \\ M & (SPA \geq M \times S) \end{cases} \quad (23)$$

Where $$SPA = Mod(SP - LD \times S, (M+1) \times S)$$

and $$LD = \frac{Mod(SL - SLA, M \times S)}{S}$$

and $$SLA = fstride(A, M, 0, S) = Mod(A + a \times M), M \times S) = Mod(b \times S, M \times S)$$
$$SPA = fstride(A, M, 1, S) = Mod(A + a \times (M+1), (M+1) \times S) = Mod(b \times S, (M+1) \times S)$$

10. Case study III

For any logic address $LA$, $SLA$ is calculated as $$SLA = fstride(LA, M, 0, S) = Mod(LA + a \times M, M \times S) = Mod(b \times S, M \times S) \quad (a, b \geq 0)$$

let $$LA = p + q \times S$$

where $$p = Mod(LA, S) \quad (24)$$
$$q = \lfloor LA/S \rfloor$$

then $$SLA = p + q \times S + a \times M = b \times S$$

Here, $N$ is $0$ for logic address space. Note once again that the value $a$ is an offset, and the value $b$ expresses an equivalent value not dependent on $LA$.

To get $SA$ which is related to $A$, either $a$ or $b$ is required:

$$let \quad a = p \quad then$$
$$SLA = LA + p \times M = b \times S \quad (25)$$

Table 1 describes examples of related combinations of $M$ and $S$. Here $S$ and $M$ are coprime. Note that in the event M were selected to be a prime number, all values of $0 < S < M$ would provide for effective circular rotation.

Table 1

| M | 255 | 511 | 1023 | 2047 | 512 | 1024 | 571 |
|---|---|---|---|---|---|---|---|
| S | 1 | 1 | 1 | 1 | 1 | 1 | 1 |
|  | 2 | 2 | 2 | 2 | 3 | 5 | 2 |
|  | 4 | 4 | 4 | 4 | 9 | 25 | 4 |
|  | 8 | 8 | 8 | 8 | 19 | 41 | 11 |
|  | 16 | 16 | 16 | 16 | 27 | 205 | 13 |
|  | 32 | 32 | 32 | 32 | 57 |  | 22 |
|  | 64 | 64 | 64 | 64 | 171 |  | 26 |
|  | 128 | 128 | 128 | 128 |  |  | 44 |
|  |  | 256 | 256 | 256 |  |  | 52 |
|  |  |  | 512 | 512 |  |  | 143 |
|  |  |  |  | 1024 |  |  | 286 |

From equations (23) to (25), given logical blocks $M$ and $N$ substitute blocks, and a logical-to-physical address mapping produced from the last data movement: $L \equiv P$. For any logical-to-physical address mappings: $LA \equiv PA$.

$$PA = \begin{cases} Mod(SPA, M) & (SPA < M \times S) \\ M & (SPA \geq M \times S) \end{cases} \quad (23)$$

Where $$SPA = Mod(SP - LD \times S, (M+N) \times S)$$

and $$LD = \frac{Mod(SL - SLA, M \times S)}{S}$$

and $$SLA = fstride(LA, M, 0, S) = LA + p \times M$$

and $$p = Mod(LA, S)$$

So $$PA = Mod(Mod(SP - Mod(SL - SLA, M \times S), (M+N) \times S), M)$$
$$= Mod(Mod(Mod(P, S) \times (M+N) + P - Mod(Mod(L, S) \times M + L - Mod(LA, S) \times M - LA, M \times S), (M+N) \times S), M)$$
(26)

Where $$SP = Mod(P, S) \times (M+N) + P$$
$$SL = Mod(L, S) \times M + L$$

are produced at the time of block rotation; and $(M+N) \times S$ and $M \times S$ are related to configuration and can be produced at the time of configuration.
Only $$SLA = Mod(LA, S) \times M + LA$$
$$LD = Mod(SL - SLA, M \times S)$$
$$= Mod(Mod(L, S) \times M + L - Mod(LA, S) \times M - LA, M \times S)$$

From table 1, for given $M = 2^m - 1$, and $N=1$, we can get $S = 2^r$ and $M$ is a Mersenne number, then we can get $$M = 2^m - 1 \quad S = 2^r \quad N = 1$$
$$LA : m\,bits \quad PA : m+1\,bits$$
$$SLA : m + r\,bits \quad SPA : m + r\,bits$$

$$SLA = Mod(LA, S) \times M + LA$$
$$= (LA - (LA \gg r) \ll r) \ll m - (LA - (LA \gg r) \ll r) + LA \quad (27)$$
$$= \{LA[r-1, 0], m'b0\} + \{LA[m-1, r], r'b0\}$$

$$SL = Mod(L, S) \times M + L$$
$$= (L - (L \gg r) \ll r) \ll m - (L - (L \gg r) \ll r) + L \quad (28)$$
$$= \{L[r-1, 0], m'b0\} + \{L[m-1, r], r'b0\}$$

$$SP = Mod(P, S) \times (M + 1) + P$$
$$= \{P[r-1, 0], m'b0\} + P \quad (29)$$

$$SLD = LD \times S = Mod(SL - SLA, M \times S)$$
$$= \begin{cases} SL - SLA & (SL \geq SLA) \\ SL - SLA + M \times S & (SL < SLA) \end{cases} \quad (30)$$
$$= \begin{cases} SL - SLA & (SL \geq SLA) \\ (SL + M \times S) - SLA & (SL < SLA) \end{cases}$$

$$SPA = Mod(SP - SLD, (M + 1) \times S)$$
$$= \begin{cases} SP - SLD & (SP \geq SLD) \\ SP - SLD + (M + 1) \times S & (SP < SLD) \end{cases} \quad (31)$$
$$= \begin{cases} SP - SLD & (SP \geq SLD) \\ (SP + (M + 1) \times S) - SLD & (SP < SLD) \end{cases}$$
$$\text{where} \quad SP + (M + 1) \times S = SP + 2^{m+r} = \{1'b1, SP\} \quad (m + r + 1\,bits)$$

For the case of $M$ as a Mersenne number, the modular operation of integer $L$ by $M$, that is $Mod(L, 2^m - 1)$, can be simplified as follows Let $L$ consist of two fields $U$ and $V$ with length of $u$ and $m$, and the least significant $m$ bits of $U$ are represented by $U_1$, and second $m$ bits are represented by $U_2$ and so forth. The layout of L is depicted in Fig. A1.

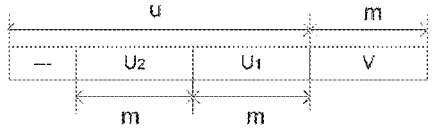

Fig. A1. Bits layout of integer L

Then, $$L = V + 2^m \times U_1 + 2^{2m} \times U_2 + 2^{3m} \times U_3 + \cdots$$

Since $Mod(2^m, 2^m - 1) = 1$, we can get $$Mod(L, 2^m - 1) = V + U_1 + U_2 + U_3 + \cdots$$

So, modular operations of integer $L$ by $M$ can be implemented by a sequence of additions without use of a divider.

For $0 \leq SPA \leq (M+1) \times S$ and $S = 2 \leq (M+1) \times S$, we can get $$Mod(SPA, M) = SPA \,\&\, ((1 << m) - 1) + (SPA \,\&\, (\sim ((1 << m) - 1)))$$

then, $$PA = \begin{cases} Mod(SPA, M) & (SPA < M \times S) \\ M & (SPA \geq M \times S) \end{cases}$$

$$= \begin{cases} SPA \,\&\, ((1 << m) - 1) + (SPA \,\&\, (\sim ((1 << m) - 1))) & (SPA < M \times S) \\ M & (SPA = M \times S) \end{cases}$$

$$= \begin{cases} SPA[m+r-1, r] + SPA[r-1, 0] & (SPA < M \times S) \\ M & (SPA = M \times S) \end{cases} \quad (32)$$

Where, $M = 2^m - 1$, $N=1$, and $S = 2^r$ are as shown in table 1.

From equations (27) to (32), address translation from LA to PA can be derived from a sequence of bit shifts, subtractions, and additions, which is low cost and low latency.

11. Circular block rotation with random stride

For a system starting with natural address mapping, $M$ logical blocks, $N$ substitute blocks, and block rotations following the policy of circular block rotation with stride $S$, the block address mapping from logical address LA to physical address PA is determined according to equations (18) and (19). The stride circular block rotation period C is determined according to the least common multiple of M and M+N from lemma 7.2.

For any logical-to-physical address mappings: $LA \equiv PA$.

$$LD = PD = \| P - PA \| = \frac{Mod(SP - SPA, (M+N) \times S)}{S} = \frac{Mod(SL - SLA, M \times S)}{S}$$

$$SPA = Mod(SP - LD \times S, (M+N) \times S) \quad (18)$$

$$PA = \begin{cases} Mod(SPA, M) & (SPA < M \times S) \\ SPA/S & (SPA \geq M \times S) \end{cases} \quad (19)$$

where $$SLA = fstride(A, M, 0, S) = Mod(A + a \times M), M \times S) = Mod(b \times S, M \times S)$$

$$SPA = fstride(A, M, 1, S) = Mod(A + a \times (M+1), (M+1) \times S) = Mod(b \times S, (M+1) \times S)$$

and $L \equiv P$ is the logical-to-physical address mapping produced at the last data movement iteration via stride circular rotation.

To randomize the block rotation for improving memory system security and balancing the wear leveling across the blocks, one or more of the three factors S, M and N can be dynamically changed after each stride circular block rotation period. By doing so, the logical-to-physical address mapping can be resolved by equations (18) and (19) within each stride circular block rotation period as long as S is not a factor of M.

We claim:

1. A method of managing memory, the method comprising:
mapping a set of M logically addressable blocks of data in a one-to-one correspondence to a first set of M physically addressable storage sections in the memory;
tracking a second set of N physically addressable storage sections in the memory, where N≥1, the second set not overlapping the first set;
maintaining a stride value S, where S>1;
exchanging a storage section of the first set with a storage section in the second set, where the storage section of the first set that is exchanged is selected based on a distance equal to the stride value S in logical address space from one of the M logically addressable blocks of data that was stored in a storage section the subject of an immediately previous exchange; and
repeating the exchanging for different storage sections of the first set;
where the method further comprises tracking a third set of physically addressable storage sections in the memory, the third set not overlapping the first set or the second set, and after a selected number C of the exchanges, increasing the number of storage sections in one of the first set or the second set by removing sections from the third set and adding the removed sections to the first set or the second set.

2. The method of claim 1, where the repeating is performed as a periodic wear leveling function in response to a trigger event, and where the trigger event is one of:
(a) a logical address receiving write data;
(b) a write data count for a logical address exceeding a count threshold;
(c) a value of a time counter exceeding a time threshold;
(d) reaching a calendared time; and
(e) a combination of two or more of (a)-(d).

3. The method of claim 1, where the stride value S and number of logically addressable blocks of data M are coprime.

4. The method of claim 1, wherein the selected number C is a number of the exchanges that returns the mapping of the logically addressable blocks of data back to an initial condition.

5. The method of claim 1, wherein exchanging comprises copying the contents of the storage section selected in the first set to the storage section in the second set that is to be exchanged into the first set as part of the exchange.

6. The method of claim 5, where the storage section of the first set and the storage section of the second set share a common group of sense amplifiers, and where copying the contents comprises reading the contents of the storage section selected from the first set with the common group of sense amplifiers, and then writing the contents of the common group of sense amplifiers to the storage section of the second set that is to be exchanged into the first set as part of the exchange.

7. The method of claim 1, where the start position is a logical address and where updating the start position includes circular addition of an address offset corresponding to the stride value S to the logical address of data held in the storage section that was the subject of the immediately previous exchange at the time of such exchange.

8. The method of claim 1, where the stride value S is an integer power of two, and where M is equal to a power of two minus one.

9. The method of claim 1, further comprising storing the stride value S in a register internal to a memory device that is part of the memory.

10. The method of claim 1, further comprising storing the stride value S in a register internal to a memory controller.

11. The method of claim 1, embodied as a method of managing at least one nonvolatile memory device contained in the memory.

12. The method of claim 1, where the memory further comprises hardware address translation logic, further comprising:
receiving a write command and an associated logical address directed to one of the M logically addressable blocks of data;
dynamically translating the associated logical address to a physical address holding the corresponding one of the logically addressable blocks of data using the hardware translation logic; and
writing data that is the subject of the write command to the physical address.

13. The method of claim 1, further comprising tracking parameters representing the mapping, and servicing a memory command by dynamically computing a physical address for data associated with the memory command, including identifying a logical memory address associated with the command, dynamically calculating a physical address associated with the logical address in dependence on the tracked parameters, and using the physical address to identify a location associated with data within the memory.

14. A method of managing memory, the method comprising:
mapping a set of M logically addressable blocks of data in a one-to-one correspondence to a first set of M physically addressable storage sections in the memory;
tracking a second set of N physically addressable storage sections in the memory, where N≥1, the second set not overlapping the first set;
maintaining a stride value S, where S>1;
exchanging a storage section of the first set with a storage section in the second set, where the storage section of the first set that is exchanged is selected based on a distance equal to the stride value S in logical address space from one of the M logically addressable blocks of data that was stored in a storage section the subject of an immediately previous exchange; and
repeating the exchanging for different storage sections of the first set;
where the method further comprises keeping the stride value S constant over an integer multiple of C, where C is further equal to a least common multiple of M and M+N and selectively varying S at a time where a number of the exchanges relative to the initial condition equal to an integer times C.

15. The method of claim 14, where each storage section comprises an integer number of rows of storage cells of a memory device, where the integer number is one or more.

16. A method of managing memory, the method comprising:
mapping a set of M logically addressable blocks of data in a one-to-one correspondence to a first set of M physically addressable storage sections in the memory;
tracking a second set of N physically addressable storage sections in the memory, where N≥1, the second set not overlapping the first set;
maintaining a stride value S, where S>1;
exchanging a storage section of the first set with a storage section in the second set, where the storage section of the first set that is exchanged is selected based on a distance equal to the stride value S in logical address space from one of the M logically addressable blocks of data that was stored in a storage section the subject of an immediately previous exchange; and repeating the exchanging for different storage sections of the first set;

where the memory comprises hardware address translation logic;

where the method further comprises receiving a write command and an associated logical address directed to one of the M logically addressable blocks of data, dynamically translating the associated logical address to a physical address holding the corresponding one of the logically addressable blocks of data using the hardware translation logic, and writing data that is the subject of the write command to the physical address; and where the hardware translation logic is to map the logical address to the physical address according to $$PA = f(\text{Mod}_{(S \times M + S \times N)}(SP - \text{Mod}_{S \times M}(SL - SLA))),$$

where PA is the physical address, LA is the logical address, SL and SP respectively represent a logical address of data associated with the selected storage section during an immediately previous performance of the exchanging, f( ) represents a functional dependence of PA on values within the encompassed parentheses, and a physical address of the storage section in the second set that was the subject of the immediately previous exchanging, and Mod represents a modulo operation.

17. A memory device comprising storage sections, the memory device further comprising:

memory array access logic to store data within a first set of the storage sections while reserving at least one storage section as part of a second set; and wear leveling circuitry to select a storage section in the first set based on a start position, copy data from the selected storage section in the first set to a target storage section in the second set, the selected storage section then becoming a member of the second set, and the target storage section then becoming a member of the first set, update the start position based on a stride value S, where S>1, and repeat the selecting, copying and updating;

where the memory device further comprises a third set of storage sections, the third set not overlapping the first set or the second set, and where the wear leveling circuitry is to, after a selected number C of the exchanges, increase the number of storage sections in one of the first set or the second set by removing sections from the third set and adding the removed sections to the first set or the second set.

18. The memory device of claim 17, further comprising resident address translation logic to dynamically compute a physical address based on a logical address provided in association with a memory command directed to the memory device, to thereby service the memory command remapping of the logical address within the memory device as a function of the wear leveling.

19. A method in a memory device, comprising:

maintaining storage sections in first and second groups each having at least one storage section, at least the first group to store data;

identifying one of the storage sections in the first group upon which data movement is to be effected;

moving the identified one of the storage sections in the first group to the second group, and moving one of the storage sections from the second group to the first group, including copying associated data from the identified one of the storage sections from the first group to the one of the storage sections moved from the second group to the first group; and repeating the identifying and moving, with respect to different storage sections in the first group such that each storage section in the first group is rotated into the second group and eventually back to the first group on a circular basis, and selection of each storage section in the first group is based on a stride value S, S>1, and a logical address of data previously associated with a storage section that was previously the subject of identifying and moving;

where the stride value S is constant over a number (C) of repetitions of the identifying and moving equal to common multiple of M and M+N, where M is a number of storage sections in the first group, and N is a number of storage sections in the second group and where the method further comprises selectively varying S at a time when C is equal to a common multiple of M and M+N.

20. The method of claim 19, embodied as a wear leveling method.

21. The method of claim 19, where the identified one of the storage sections is selected based on a logical address associated with a storage section moved from the first group during an immediately previous iteration of the repeating.

22. A memory device comprising storage sections, the memory device further comprising:

memory array access logic to store data within a first set of the storage sections while reserving at least one storage section as part of a second set; and wear leveling circuitry to select a storage section in the first set based on a start position, copy data from the selected storage section in the first set to a target storage section in the second set, the selected storage section then becoming a member of the second set, and the target storage section then becoming a member of the first set, update the start position based on a stride value S, where S>1, and repeat the selecting, copying and updating;

where the stride value S is constant over a number (C) of repetitions of the identifying and moving equal to a least common multiple of the number of storage sections in the first set and the number of storage sections in the second set and where the wear leveling circuitry is further to vary the stride value S at a time when S is equal to a common multiple of the number of storage section in the first set and the number of storage sections in the second set.

23. A method in a memory device, comprising:

maintaining storage sections in first and second groups each having at least one storage section, at least the first group to store data;

identifying one of the storage sections in the first group upon which data movement is to be effected;

moving the identified one of the storage sections in the first group to the second group, and moving one of the storage sections from the second group to the first group, including copying associated data from the identified one of the storage sections from the first group to the one of the storage sections moved from the second group to the first group; and repeating the identifying and moving, with respect to different storage sections in the first group such that each storage section in the first group is rotated into the second group and eventually back to the first group on a circular basis, and selection of each storage section in the first group is based on a stride value S, S>1, and a logical address of data previously associated with a storage section that was previously the subject of identifying and moving;

where the method further comprises tracking a third group of at least one storage section in the memory, the third group not overlapping the first group or the second group, and after a selected number C of iterations of the repeating, increasing the number of storage sections in one of the first group or the second group by removing at least one section from the third group and adding each removed section to the first group or the second group.

\* \* \* \* \*